US011588619B2

(12) United States Patent
Revankar et al.

(10) Patent No.: US 11,588,619 B2
(45) Date of Patent: Feb. 21, 2023

(54) GENERATING CUSTOMIZED SMART CONTRACTS

(71) Applicant: Adobe Inc., San Jose, CA (US)

(72) Inventors: Shriram Venkatesh Shet Revankar, San Jose, CA (US); Xuejun Xu, Cupertino, CA (US); Oliver Goldman, Seattle, WA (US)

(73) Assignee: Adobe Inc., San Jose, CA (US)

( * ) Notice: Subject to any disclaimer, the term of this patent is extended or adjusted under 35 U.S.C. 154(b) by 178 days.

(21) Appl. No.: 17/100,638

(22) Filed: Nov. 20, 2020

(65) Prior Publication Data

US 2021/0143979 A1 May 13, 2021

Related U.S. Application Data

(62) Division of application No. 16/160,736, filed on Oct. 15, 2018, now Pat. No. 10,880,074.

(51) Int. Cl.
*H04L 9/06* (2006.01)
*G06Q 20/06* (2012.01)
(Continued)

(52) U.S. Cl.
CPC .......... *H04L 9/0637* (2013.01); *G06Q 20/06* (2013.01); *H04L 9/3213* (2013.01); *G06Q 2220/00* (2013.01); *H04L 9/50* (2022.05)

(58) Field of Classification Search
CPC ....... H04L 9/0637; H04L 9/3213; H04L 9/50; H04L 9/3239; G06Q 20/06; G06Q 2220/00; G06Q 20/02; G06Q 20/38215
See application file for complete search history.

(56) References Cited

U.S. PATENT DOCUMENTS 10,146,792 B1 * 12/2018 Dobrek ................. H04L 9/32
10,250,394 B1    4/2019 Borne-Pons et al.
(Continued)

OTHER PUBLICATIONS

Ethereum Project. (n.d.) Retrieved Oct. 15, 2018 from the INternet at <https://www.ethereum.org/>. 8 pages.
(Continued)

*Primary Examiner* — Darren B Schwartz
(74) *Attorney, Agent, or Firm* — Shook, Hardy & Bacon L.L.P.

(57) ABSTRACT

Embodiments relate to a smart contract platform that facilitates creation, execution and verification of customized smart contracts. The smart contract platform enables design of customized smart contracts for execution and verification on a distributed ledger network, including smart contracts with logic for querying and fetching sensitive transactional data from participant nodes. A distributed ledger can store tokens indicating successful completion of one or more transaction elements without making some or all the associated transactional data visible. A smart contract form viewer can be used to view and interact with a smart contract form linked to the smart contract. The smart contract form can present contractual provisions in natural language, present transactional data to an authorized user, and accept entry or validation of designated transaction data. As such, the smart contracts described herein provide visibility and verifiability without the lost privacy and lack of customizability that exist with present solutions.

17 Claims, 10 Drawing Sheets

(51) Int. Cl.
*H04L 9/32* (2006.01)
*H04L 9/00* (2022.01)
*G06Q 20/02* (2012.01)
*G06Q 20/38* (2012.01)

(56) References Cited

U.S. PATENT DOCUMENTS

| | | | | |
|---|---|---|---|---|
| 10,250,395 | B1* | 4/2019 | Borne-Pons | H04L 63/12 |
| 10,419,209 | B1 | 9/2019 | Griffin et al. | |
| 10,482,554 | B1* | 11/2019 | Vukich | G06Q 50/188 |
| 10,581,591 | B1* | 3/2020 | Branton | H04L 9/3239 |
| 2016/0330034 | A1* | 11/2016 | Back | G06Q 20/065 |
| 2017/0046689 | A1 | 2/2017 | Lohe et al. | |
| 2017/0155515 | A1 | 6/2017 | Androulaki et al. | |
| 2017/0287090 | A1* | 10/2017 | Hunn | G06Q 50/18 |
| 2017/0364908 | A1* | 12/2017 | Smith | G06Q 20/023 |
| 2018/0005186 | A1* | 1/2018 | Hunn | G06F 16/93 |
| 2018/0019879 | A1 | 1/2018 | Kravitz et al. | |
| 2018/0025442 | A1* | 1/2018 | Isaacson | H04L 63/0861 |
| | | | | 705/26.62 |
| 2018/0204213 | A1 | 7/2018 | Zappier et al. | |
| 2018/0218176 | A1* | 8/2018 | Voorhees | G06Q 20/02 |
| 2018/0227116 | A1* | 8/2018 | Chapman | H04L 9/0637 |
| 2018/0309567 | A1 | 10/2018 | Wooden | |
| 2018/0314809 | A1* | 11/2018 | Mintz | H04L 9/3297 |
| 2018/0315141 | A1 | 11/2018 | Hunn et al. | |
| 2018/0365201 | A1* | 12/2018 | Hunn | G06F 40/134 |
| 2019/0188399 | A1 | 6/2019 | Palaniappan et al. | |
| 2019/0205563 | A1* | 7/2019 | Gonzales, Jr. | G06F 21/10 |
| 2019/0207770 | A1 | 7/2019 | Zhou | |
| 2019/0294822 | A1* | 9/2019 | Hennebert | G06F 21/602 |
| 2019/0334920 | A1* | 10/2019 | Kelly | H04L 9/3239 |
| 2019/0370799 | A1* | 12/2019 | Vivas | H04L 9/3239 |
| 2019/0392178 | A1* | 12/2019 | Rice | H04L 9/3247 |
| 2019/0392438 | A1* | 12/2019 | Rice | G06Q 20/389 |
| 2019/0392536 | A1* | 12/2019 | Rice | H04L 67/535 |
| 2020/0004788 | A1 | 1/2020 | Qiu | |
| 2020/0092360 | A1* | 3/2020 | Viswanathan | H04L 67/1093 |
| 2020/0118131 | A1 | 4/2020 | Diriye et al. | |
| 2020/0357084 | A1* | 11/2020 | Lerato Hunn | H04L 9/32 |
| 2021/0090108 | A1* | 3/2021 | Moreno Molina | G06Q 20/342 |

OTHER PUBLICATIONS

Account Types, Gas, and Transactions. (n.d.) Retrieved Oct. 15, 2018 from the Ethereum Homestead Documentation at <http://www.ethdocs.org/en/latest/contracts-and-transactions/account-types-gas-and-transactions.html>. 11 pages.

* cited by examiner

GENERATING CUSTOMIZED SMART CONTRACTS

CROSS-REFERENCE TO RELATED APPLICATIONS

This application is a Division of U.S. patent application Ser. No. 16/160,736 filed Oct. 15, 2018 and titled "Smart Contract Platform For Generating And Customizing Smart Contracts," the entire contents of which are incorporated by reference herein.

BACKGROUND

Various techniques are available for automating aspects of contractual agreements. For example, electronic signature services such as ADOBE® SIGN can replace paper and ink signature processes with automated electronic signature workflows. In another example, contracts can be implemented with computer programs called smart contracts that can facilitate and verify contract formation and automatically enforce the contract. For example, a smart contract can execute code that monitors for triggering events (e.g., agreement, performance, breach, condition precedent, etc.) and enforces a corresponding contractual provision by automatically performing the provision (e.g., performance, counterperformance, remedies, etc.). In this sense, smart contracts can facilitate, automatically perform, and/or verify negotiation, formation, and enforcement of contractual agreements.

SUMMARY

Embodiments of the present invention relate to a smart contract platform that facilitates the creation, execution and verification of customized smart contracts. The smart contract platform provides a simplified interface that allows users to select and arrange a series of transaction elements for a customized smart contract workflow. The smart contract platform automatically generates a smart contract based on the customized workflow using syntax of a smart contract execution environment associated with a distributed ledger network. As such, the smart contract platform facilitates construction of customized smart contracts without requiring knowledge of the syntax of the smart contract execution environment.

The smart contract platform enables the creation of a new type of smart contract that automatically queries and fetches transactional data (or a verification of transactional information) from one or more third party sources. For example, in order for a prospective borrower to obtain a loan, the borrower normally needs to provide certain financial information. In some embodiments, a smart contract can include logic that automatically fetches and/or verifies such information from third party participants to the smart contract, such as banks, government agencies, employers, and the like. Each participant to the smart contract can operate a node on the distributed ledger network. A participant node operated by or associated with a user (e.g., a prospective borrower, a bank, an insurance company, etc.) can issue a token (e.g., an authorization token) authorizing one or more participant nodes to access, disclose, and/or verify transactional data owned or associated with the user. The token can be provided to a participant node directly and/or to a plurality of nodes in a distributed ledger network for storage with the smart contract in a distributed ledger (e.g., on the blockchain), for example, upon verification by a consensus of nodes. Upon accessing the token and/or the associated transaction, the participant node can access, disclose, and/or verify the transactional data according to instructions and/or authorization contained in parameters and/or metadata associated with the transaction and/or contained in the smart contract.

In some embodiments, a digital token (e.g., a crypto token, utility token) can be issued indicating one or more transactional elements have occurred. For example, one or more transactional elements can each be associated with one of a plurality of public keys, and a token may be issued (e.g., signed) with a particular private key corresponding to a performed transactional element(s). In this manner, a verified digital token can indicate that one or more associated transaction elements have been successfully completed, such as verification or provision of transactional data (e.g., W2s, account balances, etc.). In another example, a participant may spend a certain number of crypto tokens to complete one or more transactional elements (e.g., to complete a loan application). Generally, a participant node can issue a token to indicate that designated transactional data has been verified, and the participant node can provide the token and/or proof of transfer to a distributed ledger network for storage on the blockchain. Some or all of the transactional data may be omitted from storage, or included in an encrypted or otherwise uninterpretable format. In this manner, sensitive information can be shielded from publication on the blockchain.

In some embodiments, a smart contract form associated with the smart contract can be presented in a smart contract viewer of the smart contract platform. While a smart contract is generally comprised of computer code, a corresponding smart contract form comprises corresponding contractual provisions in natural language. The smart contract form can include one or more fields linked to the smart contract to facilitate the presentation, entry and/or verification of associated transactional data. The smart contract viewer can allow access to a smart contract form, particular transactional data, and/or entry into a particular field by an authorized user, and can disallow access by an unauthorized user. Upon entry or verification of transactional data (e.g., via a digital signature), the transactional data can be transmitted to the smart contract for processing. In this manner, the smart contracts described herein provide visibility and verifiability without the lost privacy and lack of customizability that exist with present solutions.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein.

DETAILED DESCRIPTION

Figure 1:
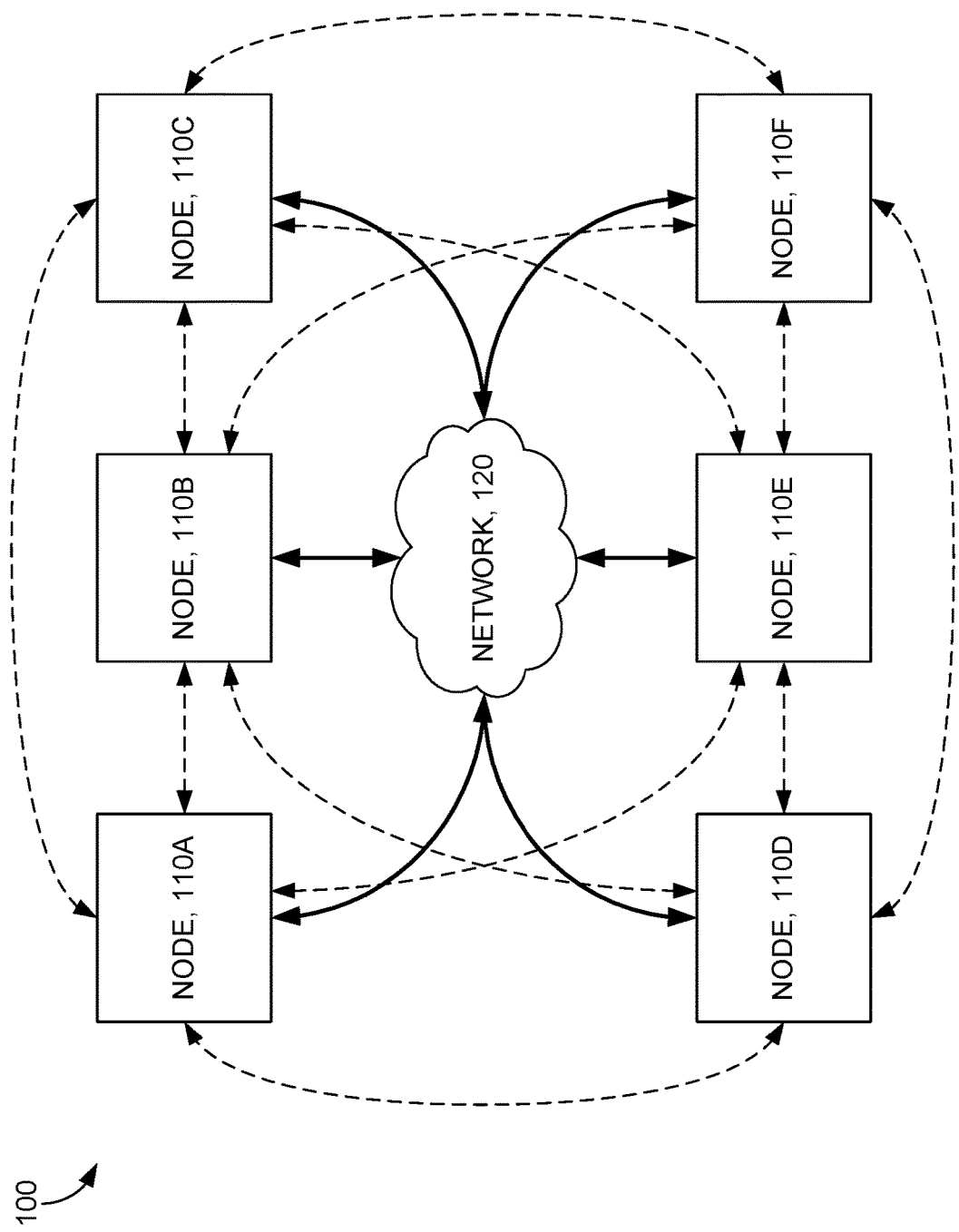
FIG. 1 is an exemplary system diagram of a distributed ledger network in accordance with some embodiments of the present invention.

Various drawbacks exist with current techniques for automating aspects of contractual agreements. Generally, services that provide workflow solutions for automating portions of contracts require some level of trust between participants. In procurement scenarios, for example, a particular user must predefine and authorize all of the participants for a particular project. Those participants are provided with authorization and certain access rights to participate in the desired procurement workflow. These types of workflow solutions only work where trust exists among all parties, which is often not the case. Furthermore, the state of these workflows and associated transactions is generally not independently verifiable by third parties, and in some cases, by some participating parties. In this sense, some parties can claim lack of execution or performance by another party because there is no mechanism for independent verification of formation or compliance. In many cases, the absence of such visibility and verifiability leads to increased transactions costs based on detection and enforcement efforts, diminishing the efficiency of the transaction.

Smart contracts may be seen as addressing some of these drawbacks, but at the cost of lost privacy and lack of customizability. Although smart contracts can be executed on the blockchain to provide visibility and verifiability of a particular transaction, many transactions involve sensitive information such as personally identifiable information (PII) and financial information that either ought to remain private or, by law, must remain private. As such, smart contracts can create legal or prudential problems that foreclose their use. Furthermore, current smart contracts and other automated workflow solutions are difficult and costly to customize. For example, each smart contract generally requires a custom solution tailored to the information systems of the various parties to provide any new features or functionality. These and other drawbacks exist with current techniques for automating aspects of contractual agreements.

Accordingly, embodiments of the present disclosure are directed to a smart contract platform that facilitates the creation, execution and verification of customized smart contracts. More specifically, embodiments of the present invention provide a simplified interface that allows a user to select and arrange a series of transaction elements for a customized smart contract workflow for execution and verification on a distributed ledger network. In some embodiments, the smart contract platform provides the ability to create smart contracts that that include logic for querying and fetching designated information (e.g., tokens and/or transactional data) from third party participants. Generally, it may be desired to avoid publication of some types of transactional data such as personal financial records due to privacy concerns and/or legal requirements. As such, a distributed ledger can store proof that a particular transaction element occurred without making some or all the associated transactional data visible. A smart contract form viewer can be used by an authorized user to view and interact with a smart contract form linked to the smart contract. Generally, the smart contract form presents contractual provisions in natural language, and can include one or more fields linked to the smart contract to facilitate the presentation, entry and/or verification of associated transactional data.

Generally, a smart contract platform can be provided with an interface that facilitates the creation, execution and verification of customized smart contracts. The smart contract platform can incorporate or otherwise interface with a smart contract execution environment configured to execute smart contracts over a distributed ledger network that provides verifiability and immutability. For a particular workflow scenario (e.g., obtaining a home loan), the smart contract platform can enable users to create customized workflows (smart contracts) that can initiate and execute a series of transaction elements for the workflow (e.g., conditions precedent, performance of obligations, etc.). Generally, the smart contract platform provides a simplified interface that allows a user to select and arrange a series of transaction elements for a customized smart contract workflow, and the smart contract platform automatically generates a smart contract based on the customized workflow using syntax of a smart contract execution environment associated with a distributed ledger network. As such, the smart contract platform can automatically integrate consensus algorithms and cryptocurrencies without requiring knowledge of the syntax of the smart contract execution environment.

In some embodiments, the smart contract platform provides the ability to create a new type of smart contract that that includes logic for querying and fetching designated information (e.g., tokens and/or transactional data) from third party sources that will be participants to the smart contract. Taking a home loan as an example, a prospective borrower normally must provide a lender with certain financial records, such as current bank statements, tax records, employments paystubs, etc. With traditional contracts, the custodians of these records are generally nonparties or third parties to the contract (e.g., the loan). In certain embodiments, these third party sources may participate in a corresponding smart contract. In some embodiments, a user (e.g., a prospective borrower) can automatically authorize a range of smart contract participants to access, disclose and/or verify designated information. Each participant to the smart contract can operate a node on the distributed ledger network. A user may create or execute a smart contract from any designated participant node (e.g., operated by a prospective borrower, a bank, an escrow company, a title company, etc.) When a user creates or executes a smart contract (e.g., signs a loan application), an authorization token can be generated and issued to authorize retrieval, disclosure and/or verification of the designated information associated with each participant, for example, according to logic or other instructions included in parameters and/or metadata associated with a corresponding transaction (e.g., for the last transfer of the token) and/or included in an associated smart contract. The token can be provided to a participant node directly and/or to a plurality of nodes in a distributed ledger network for storage with the smart contract on the blockchain (e.g., upon verification by a consensus of nodes).

When a participant node accesses the token, the node (or a representative associated with the node) can access, disclose, and/or verify the transactional data according to instructions and/or authorization associated with the token (e.g., contained in parameters and/or metadata associated with a corresponding transaction and/or contained in an associated smart contract). For example, a participant's local system can be integrated with the smart contract platform such that a particular smart contract can access transactional data belonging to a participant to the smart contract (e.g., balances, tax returns, paystubs, etc.) and pull the information into the smart contract itself. More generally, smart contracts can be created with logic that preauthorizes and queries different entities (e.g., banks, financial institutions, government institutions, private employers, etc.) for transactional data of a user to collect the designated information and make it available to, or verify it for, other participants to the smart contract.

By way of nonlimiting example, assume a number of parties participate in the smart contract platform (e.g., 25 banks, the IRS, a realtor association, private employers, potential borrowers, etc.), each operating a node in a distributed ledger network. The present smart contract platform can automate the process of initiating, executing, and enforcing transactions such as mortgage loans. The requisite financial information for a smart mortgage workflow can be automatically collected and/or verified, and all the participants to the smart mortgage can access the underlying application and view its progress at any stage. Generally, there is a shared requirement that all participants can reconcile all transaction elements of the smart mortgage. For example, a node operated by a lender may request that a node operated by a particular bank verify that the bank's copy of a distributed ledger includes a record indicating that the lender node requested, and the bank node provided, an account balance for the borrower. When a transaction element can be verified by consensus of nodes in the distributed ledger network, the smart mortgage can advance to a subsequent stage of the workflow.

It may be desired to avoid publication of some types of transactional data such as personal financial records due to privacy concerns and/or legal requirements. As such, a distributed ledger can store proof that a particular transaction element occurred, without making the associated transactional data visible. For example, one or more transactional elements can each be associated with one of a plurality of public keys, and a token may be issued (e.g., signed) with a particular private key corresponding to a performed transactional element(s). In this manner, a verified digital token can indicate that one or more associated transaction elements have been successfully completed, such as verification or provision of transactional data (e.g., W2s, account balances, etc.). In another example, a participant may spend a certain number of crypto tokens to complete one or more transactional elements (e.g., to complete a loan application), and proof of transfer of the token(s) can indicate successful completion of the associated transactional element(s). In this manner, a token can be issued as a record that a certain number of transactional elements did in fact occur, and the token and/or proof of transfer can be stored in the distributed ledger without providing access to some or all of the underlying transactional data. As such, a token can be used to shield sensitive information while providing verifiable proof that the associated transactional elements occurred.

In some embodiments, some transactional data may additionally or alternatively be stored in the distributed ledger. Some or all of the published transactional data may be encrypted or otherwise made uninterpretable. In this sense, some transactions and/or transactional data (e.g., identification of a plot of land, identification of parties, proof of transfer, etc.) may be publically visible and interpretable, some transactions and/or transactional data may be publically visible but not interpretable (e.g., employment records, residential history, etc.), and some transactions and/or transactional data may not be publically visible or interpretable (e.g., personal bank records or other financial information).

In some embodiments, a smart contract form associated with the smart contract can be presented in a smart contract viewer of the smart contract platform. While the smart contract may be comprised of computer code, a smart contract form can express the corresponding contractual provisions in natural language. Generally, the smart contract form is a document that represents the state of a smart contract at a given point in time. The smart contract form may include fields that are linked to associated transactional data of the smart contract to facilitate the presentation, entry and/or verification of associated transactional data. Upon entry or verification of transactional data (e.g., via a digital signature), the transactional data can be transmitted to the smart contract for processing.

The smart contract form viewer can present a smart contract form, transactional data, and/or an associated field in various ways. The smart contract viewer can allow access to a smart contract form, particular transactional data, and/or entry into a particular field by an authorized user, and disallow access by an authorized user (e.g., using asymmetric key cryptography). In embodiments in which transactional data is encrypted or otherwise uninterpretable, the smart contract form viewer can decrypt and present the transactional data in the field, or in association with the field (e.g., click to reveal). When the user is not authorized to view associated transactional data, or the transactional data is unavailable (e.g., in embodiments in which a token provides proof that corresponding transactional data has been provided or verified without providing access to the underlying transactional data), the smart contract form can be configured to present an indication that the transactional data has been verified and/or is unavailable (e.g., by redaction, blank field, notification, or the like). In this manner, a smart contract form viewer can be used by an authorized user to view and interact with a readable version of a particular smart contract.

As such, using implementations described herein, a user can efficiently and effectively create customized smart contracts for execution and verification on a distributed ledger network. Information designated as required for a particular smart contract can be automatically queried and fetched from third party sources. Each participant can easily access and interact with a readable smart contract form that reflects the current state of the underlying smart contract. Further, sensitive information can be shielded using a token to represent successful completion of one or more transactional elements, or by encrypting the sensitive information, e.g., using asymmetric key cryptography, such that only authorized parties can decrypt the sensitive information. As such, the smart contracts described herein provide visibility and verifiability without the lost privacy and lack of customizability that exist with present solutions.

Having briefly described an overview of aspects of the present invention, various terms used throughout this description are provided. Although more details regarding various terms are provided throughout this description, general descriptions of some terms are included below to provider a clearer understanding of the ideas disclosed herein:

A smart contract generally refers to a machine-executable contract. A smart contract is a computer program that can facilitate and verify contract formation and automatically enforce the contract. For example, a smart contract can include executable code that monitors for triggering events (e.g., agreement, performance, breach, conditions precedent, etc.) and enforces a corresponding contractual provision by automatically performing the provision (e.g., performance, counter-performance, remedies, etc.) or other otherwise performing a designated transaction element (e.g., query and retrieval of information from a third party or other participant to a smart contract). In this sense, smart contracts can facilitate, automatically perform, and/or verify negotiation, formation, and enforcement of contractual agreements.

A transaction element generally refers to one or more events (e.g., transactions, conditions, etc.) of a smart contract workflow. For example, a transaction element can be an obligation, a triggering event (agreement, performance or breach of an obligation, condition precedent, etc.), or some other constituent event of a smart contract workflow.

Transactional data generally refers to information about, associated with, or collected in association with a transaction element. For example, a transaction element may require provision or verification of financial information (e.g., income, assets, debts, etc.) about one or more party to a smart contract. In this example, information provided to satisfy the transaction element (e.g., W2s, account balances, paystubs, credit card statements, etc.) is transactional data. Transactional data may comprise files or other information provided by or exchanged between participants; information generated, obtained or accessed in connection with a transaction element; metadata thereof; or other information about a transaction element.

Various types of digital tokens are referred to herein. For example, a digital token (e.g., a crypto token, utility token) can be issued as a record or other indication that a certain number of transactional elements did in fact occur. For example, one or more transactional elements can each be associated with one of a plurality of public keys, and a token may be issued (e.g., signed) with a particular private key corresponding to a performed transactional element(s). In this manner, a verified digital token can indicate that one or more associated transaction elements have been successfully completed, such as verification or provision of transactional data (e.g., W2s, account balances, etc.). In another example, a participant may spend a certain number of crypto tokens to complete one or more transactional elements (e.g., to complete a loan application). In some embodiments, a digital token may be used to identify executable code or other instructions associated with a corresponding transaction or smart contract. For example, an authorization token can indicate that disclosure of or access to sensitive information is authorized according to logic and/or instructions contained in parameters or metadata associated with a corresponding transaction (e.g., for the last transfer of the token), and/or contained in an associated smart contract. A token and/or proof of transfer can be stored in a distributed ledger (e.g., on the blockchain) using a consensus algorithm so that possession and/or the proof of transfer of the token is immutable.

A smart contract form generally refers to a document that is linked to a corresponding smart contract and reflects the underlying contract. While the smart contract may be comprised of computer code, a smart contract form can express the corresponding contractual provisions in natural language. A smart contract form may include fields that are linked to associated transactional data of the smart contract, and can display the transactional data, if available and/or authorized. In some embodiments, a smart contract form can use a format that extends an existing document format such as PDF, XML, HTML, DOC, and the like.

Exemplary Distributed Ledger Network

Turning now to FIG. 1, a schematic depiction is provided illustrating an exemplary distributed ledger network 100 in which some embodiments of the present invention may be employed. It should be understood that this and other arrangements described herein are set forth only as examples. Other arrangements and elements (e.g., machines, interfaces, functions, orders, groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The distributed ledger network 100 depicted in FIG. 1 includes a plurality of nodes 110A-110F that are each in communication with one or more nodes 110A-110F over a network, such as the Internet. In accordance with the present disclosure, each node 110A-110F is a node of a distributed ledger network, as later described in accordance with FIG. 3, which is also a computing device later described in accordance with FIG. 10. In some embodiments, and preferably for public blockchain implementations, each node 110A-110F in the distributed ledger network 100 can operate as a peer to every other node 110A-110F of the distributed ledger network 110 such that no single node 110A-110F is more influential or powerful than any other node 110A-110F. Operations performed by nodes can include, among other things, validating transactions, verifying blocks of transactions, and adding records to an immutable database that is collectively maintained by the nodes 110A-110F. It is contemplated, however, that in some embodiments, a particular subset of the nodes 110A-110F can be specifically designated for performing a subset of or all node operations described herein. In this regard, as opposed to embodiments where each node is a peer with other nodes, some embodiments can employ specially-"designated nodes" (preferably for private blockchains or ecosystems where centralization is not a concern) that perform a subset of or all of the described node operations.

In accordance with embodiments described herein, the immutable database collectively maintained by the nodes 110A-110F is referenced herein as a blockchain. The blockchain maintained by the distributed ledger network 100 includes a plurality of records. The plurality of records is immutable by virtue of the distributed nature of the distributed ledger network 100, applied cryptography concepts, and a consensus module (not shown) that is independently included and operated by any number of nodes 110A-110F.

While any node can generate a transaction to be added to the blockchain, the consensus module requires that the record be added to the blockchain only based on a determination that a consensus (e.g., greater than 50%) of the nodes 110A-110F (or designated nodes) has collectively validated the transaction. In this regard, while each node 110A-110F can independently store a copy of the blockchain, a record can only be added to the blockchain when a consensus to add the record has been reached by the nodes 110A-110F (or designated nodes) of the distributed ledger network 100.

In various embodiments, validation of a transaction is facilitated utilizing features of asymmetric key cryptography (i.e., public-private key pairs), among other things. In some aspects, as is commonly known in public blockchains (e.g., Bitcoin), a private key can be employed to generate one or more associated public keys, encrypt data that can only be decrypted by an associated public key, and/or digitally sign data or transactions. On the other hand, a public key can be employed to decrypt data encrypted by an associated private key, encrypt data that only the private key can decrypt, and/or digitally authenticate a digital signature generated by an associated private key. As public keys can be shared freely, public keys generally function as "wallet addresses" that are associated with a private key. In this regard, digital tokens or other units of value (e.g., Bitcoin) can be "transmitted" from one wallet address (i.e., a public key of a sender) to another wallet address (i.e., a public key of a receiver). In actuality, however, the transmission of a digital token or unit of value is not a physical transfer, but is represented as a record of transfer from one wallet address to another that, if validated, is recorded onto the blockchain. The record is not finalized (i.e., added to the blockchain), however, until the transfer is validated by a consensus of the nodes 110A-110F in the distributed ledger network 100.

To generate a transaction to transfer a digital token(s) or value, the owner of the sending wallet address must digitally sign the transaction with the private key associated with the sending wallet address. Nodes 110A-110F (or designated nodes) of the distributed ledger network 100 must independently determine that the transaction from the sending wallet address is valid by digitally authenticating the digital signature with the sending wallet address (i.e., the public key). The nodes 110A-110F (or designated nodes) must also independently determine, by referencing their independently-stored copy of the blockchain, that the sending wallet address is in fact associated with the digital token being transferred, or that the sending wallet address has sufficient liquidity (i.e., has a calculated aggregate value based on associated records in a local copy of the blockchain) to transfer the unit(s) of value. If a node (or designated node) in the distributed ledger network 100 determines that either of the foregoing conditions is not satisfied, the transaction is determined invalid by the node and the transaction is not passed on (e.g., communicated) to other nodes (or designated nodes) to which it is connected. On the other hand, if the node (or designated node) determines that both of the foregoing conditions are satisfied, the transaction is determined valid and the node passes on (e.g., communicates) the transaction, along with an indication that the node independently validated the transaction, to other nodes 110A-110F (or designated nodes) to which it is connected. As the nodes 110A-110F in the distributed ledger network 100 are all directly or indirectly connected to one another, this validation process continues until the nodes (or designated nodes) collectively determine that a majority (i.e., consensus) has validated the transaction. The collective determination of consensus can be facilitated by virtue of each node (or designated node) maintaining a list of other nodes (or designated nodes) on the network (e.g., by I. P. address or other identifier) along with their respective determinations of transaction validity.

After a consensus of validity for a transaction has been reached by the nodes 110A-110F (or designated nodes), the transaction awaits confirmation (i.e., addition to the blockchain). As the nodes 110A-110F (or designated nodes) can be peers with each other, any node (or designated node) can participate in the process of adding the transaction to the blockchain. For purposes of background, the blockchain includes records of validated transactions that are grouped into a cryptographically chained series of blocks, whereby each block includes a subset of these records. Any node 110A-110F (or designated node) can perform the process of block generation, which can be implemented in a variety of ways based on a consensus algorithm implemented within its consensus module including, but not limited to, proof of work, proof of stake, proof of authority, practical Byzantine Fault Tolerance, or Federated Byzantine Agreements. As the aforementioned processes for block generation are generally known in the art, additional detail for these processes are not described herein. It is contemplated, however, that any implementation of block generation and consensus determination can be employed in accordance with the present disclosure. More importantly, as the general outcome of block generation is relatively similar among these implementations, the following description is provided irrespective of the block generation aspect of the consensus module.

To add a validated transaction to the blockchain, the transaction must first be included into a block that is being generated by one of the nodes 110A-110F (or designated nodes) and subsequently validated by a consensus of the nodes (or designated nodes) in the distributed ledger network 100. The transaction can be independently included into a block, or grouped together with other transactions, either of which are included within the purview of the present disclosure. Such implementations may vary, however, based on consensus module design and/or a block size (i.e., memory limitation) implemented or defined within in the consensus module operated by the nodes 110A-110F (or designated nodes). The node generating the block must also include, into the block it is generating, a cryptographic hash of the block most-recently added to the blockchain. Once generated in accordance with consensus rules defined within the consensus module, the node generating the block can send the generated block to the nodes (or designated nodes) to which it is connected.

The nodes (or designated nodes) receiving the generated block can then verify that the block includes one or more valid transactions, includes a hash value of the block most-recently added to the blockchain, and was generated in accordance with the defined consensus rules. Upon verifying the foregoing, the nodes (or designated nodes) can pass on (e.g., communicate) the verified block to its neighboring nodes (or neighboring designated nodes). In this way, similar to how a transaction is validated by a determined consensus of the distributed ledger network 100, the generated block including at least the transaction can be verified by another determined consensus of the nodes (or designated nodes). When a determination is made by a consensus of the nodes 110A-110F (or designated nodes) that a block is verified, the newly-verified block is added to the blockchain immediately subsequent to the previously-added block, the hash of the previously-added block being included in the newly-verified block. As such, each block is cryptographically "chained" to a previous block and a subsequent block.

In other words, the cryptographic hashes facilitate maintenance of the order and accuracy of records included in the blockchain.

In some instances, if the same transaction is included into a block generated by different nodes (or designated nodes) and validated throughout the network within a substantially similar timeframe, the blocks can be temporarily confirmed leading up to a fork in the blockchain (e.g., two potential branches stemming from the main chain). The forked chain can be maintained by the nodes (or designated nodes) until a determination is made, by a consensus of the distributed ledger network 100, that one of the forks has a larger quantity of blocks than the other. Based on a subsequent determination that one of the forks is shorter than the other, the nodes (or designated nodes) can prune (e.g., delete) the shorter chain, and maintain the longer chain as the determinative blockchain.

In various embodiments, the blockchain is not necessarily limited to storing records relating to transfers of digital tokens or monetary value. In this regard, a record can include any type of electronic record, including but not limited to one or more transactions, smart contracts, electronic documents, images or other digital media, URIs, alphanumeric text, unique identifiers, I. P. addresses, timestamps, hashes of any of the foregoing, or references to any of the foregoing. Any of the foregoing examples can be viewed as being the subject of a transaction, or can be indirectly associated with a transaction. For instance, ownership of an asset stored in a medium other than the blockchain (e.g., a remote storage device, a cloud server, a database) can be referenced with a unique identifier. If the asset is a digital asset, a URI and/or hash of the digital asset can be the subject of the transaction. If the asset is a tangible asset, a unique identifier associated with the tangible asset can be the subject of the transaction. It is contemplated that any combination or alternative to the foregoing examples remain within the purview of the present disclosure.

With specific regard to smart contracts stored as records on the blockchain, a smart contract can include any algorithm that defines an action or event that is to be triggered based on a determination that one or more defined conditions precedent to the action or event have occurred. In various embodiments, a smart contract can be generated, transmitted, received, stored, validated, and/or verified by any node or computing device described in accordance with the present disclosure. It is further contemplated that a consensus module of each node or computing device in the distributed ledger network 100 is capable of interpreting and executing a Turing complete programming language, such as Solidity, by way of non-limiting example. It is further contemplated that in some embodiments, the blockchain itself is implemented based on the same programming language.

In various embodiments, smart contracts stored on the blockchain can be associated with a corresponding address, similar to that of a wallet address. The smart contract can be assigned a corresponding address by the distributed ledger network 100, or can be associated with a wallet address associated with one or more private keys. Counterparties associated with a smart contract can verify, via their respective computing devices in communication with one or more nodes of the distributed ledger network 100, that the smart contract has been immutably stored onto the blockchain based on a determined consensus of the nodes 110A-110F.

As smart contracts can be stored on the blockchain, each node (or designated node) can independently determine whether a smart contract's defined conditions precedent have occurred in order to verify that the terms of the smart contract have been met. In various embodiments, each node (or designated node) can determine the occurrence of defined conditions precedent based on electronic information communicated thereto or retrieved thereby. The electronic information can include, among other things, another transaction addressed to or referencing the smart contract, data from one or more computing devices remote from the distributed ledger network 100, data from a website, data from a database, published news events, published weather events, or any other type of electronic information that can be transmitted to or accessed by a node (or designated node) via the network 120.

Like other transactions, each node (or designated node) can communicate this verification to one or more neighboring nodes (e.g., other nodes in direct communication with the node or designated node) until a consensus of the nodes 110A-110F (or designated nodes) of the distributed ledger network 100 have collectively verified occurrence of the defined conditions precedent. Based on a determination that the defined conditions precedent has been verified by a consensus of the nodes 110A-110F, the event or action defined by the smart contract can be executed. In various embodiments, the event or action can include the processing of a transaction (e.g., a processing of a transfer for digital tokens or value) that is held or locked until a determination that the conditions precedent have occurred. In this regard, any digital asset that is subject to the smart contract can be locked (e.g., held in escrow) by the smart contract until the determination has been made.

Figure 2:
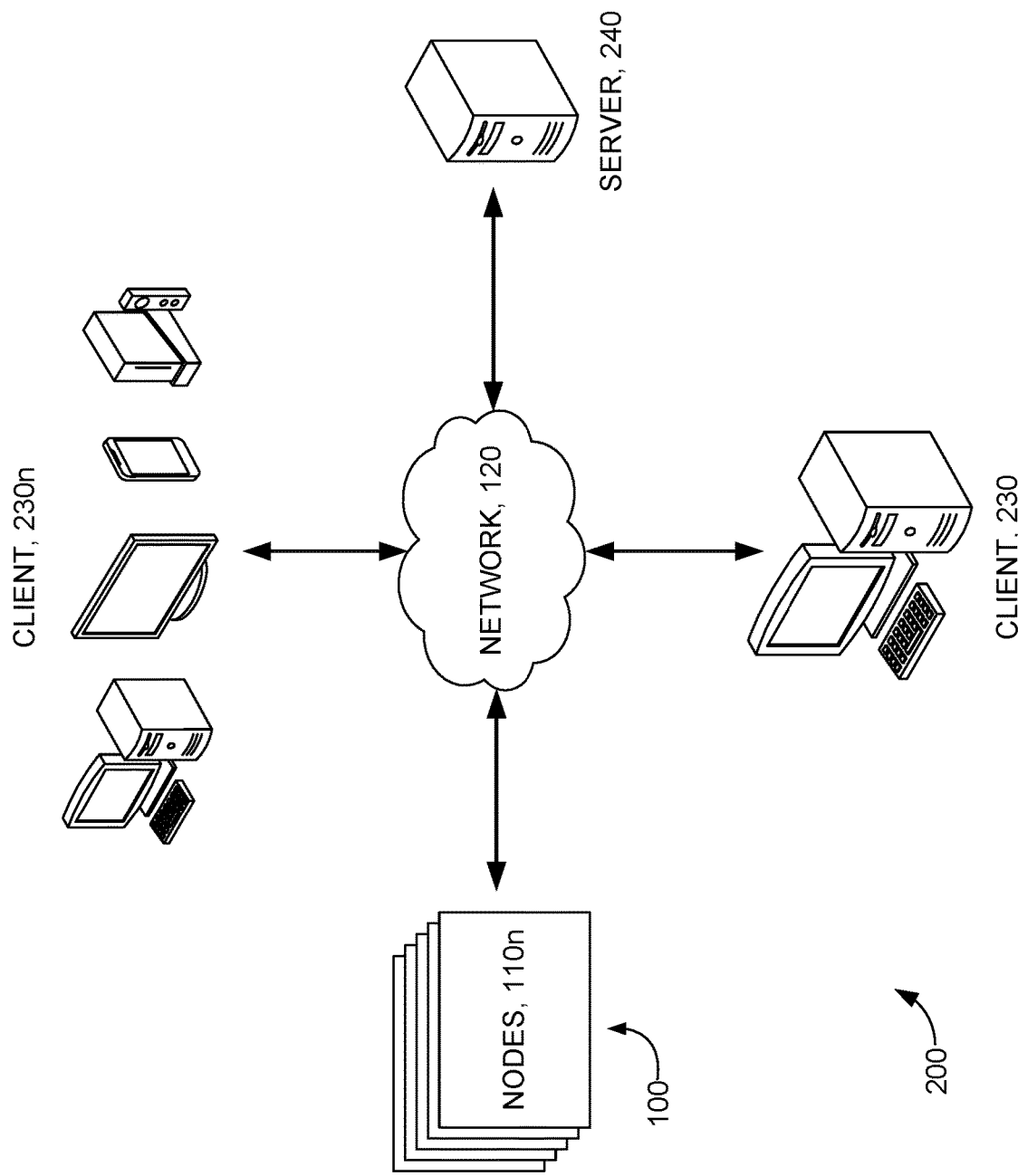
FIG. 2 is an exemplary system diagram of a smart contract customization system in accordance with some embodiments of the present invention.

Referring now to FIG. 2, a schematic depiction is provided illustrating an exemplary system 200 in which some embodiments of the present invention may be employed. It should be understood that this and other arrangements described herein are set forth only as examples. Other arrangements and elements (e.g., machines, interfaces, functions, orders, groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The system 200 can include, among other things, a distributed ledger network 100 comprising a plurality of nodes 110n as described with reference to FIG. 1, each in direct or indirect communication with one another via a network 120. It is contemplated that the nodes 110n can include a subset of designated nodes authorized to perform specifically-designated operations, such as validation, verification, or block generation, among other things. The system can also include one or more client devices, such as client 230, 230n. It is contemplated that any one or more nodes 110n can be a client 230, 230n, and one or more clients, 230, 230n can be a node in accordance with embodiments described herein. In this regard, nodes 110n and clients 230, 230n are computing devices also described herein in accordance with FIG. 10.

In one aspect, a client 230, 230n can include the consensus module similarly included in other nodes 110n (or designated nodes) within the distributed ledger network 100. In another aspect, the client 230, 230n can generate transactions that can initially be validated locally, via the consensus module included therein, before the transaction is passed on to other nodes. In another aspect, a client 230, 230n can be in communication with one or more nodes 110n via the network 120, and can locally generate a transaction for communication via the network 120 to one or more nodes 110n that the client 230, 230n is in communication with. In this way, the one or more nodes 110n (or designated nodes) receiving the transaction directly or indirectly from the client 230, 230n can validate the transaction in accordance with the present disclosure.

In some aspects, any node 110n can operate as a node that includes the consensus module, and any client 230, 230n can operate as a client device that can: transmit communications to one or more nodes 110n, generate transactions, and receive communications (e.g., transaction status, blockchain data) from one or more nodes 110n. For purposes of simplicity, the following description will reference a client 230, 230n as a node 110n, though embodiments are not limited as such.

In some embodiments, the system 200 can further include a server device, such as server 240. The server 240 can be in communication with one or more nodes 110n to send generated transactions to the one or more nodes 110n, request and receive transaction status information from the one or more nodes 110n, and/or request and receive blockchain data from the one or more nodes 110n, among other things. In some further embodiments, server 240 can include can include one or more computing devices, also described in accordance with FIG. 10, whereby the one or more computing devices include a consensus module to operate as a node 110n (or designated node). Among other things, the server 240 can further provide one or more services, such as data storage services, web hosting services for one or more websites, user authentication services, certificate authentication services, backup services, data mining services, "cloud"-stored data or web search services, block explorer services, analytics services, and the like, including any combination thereof.

Figure 3:
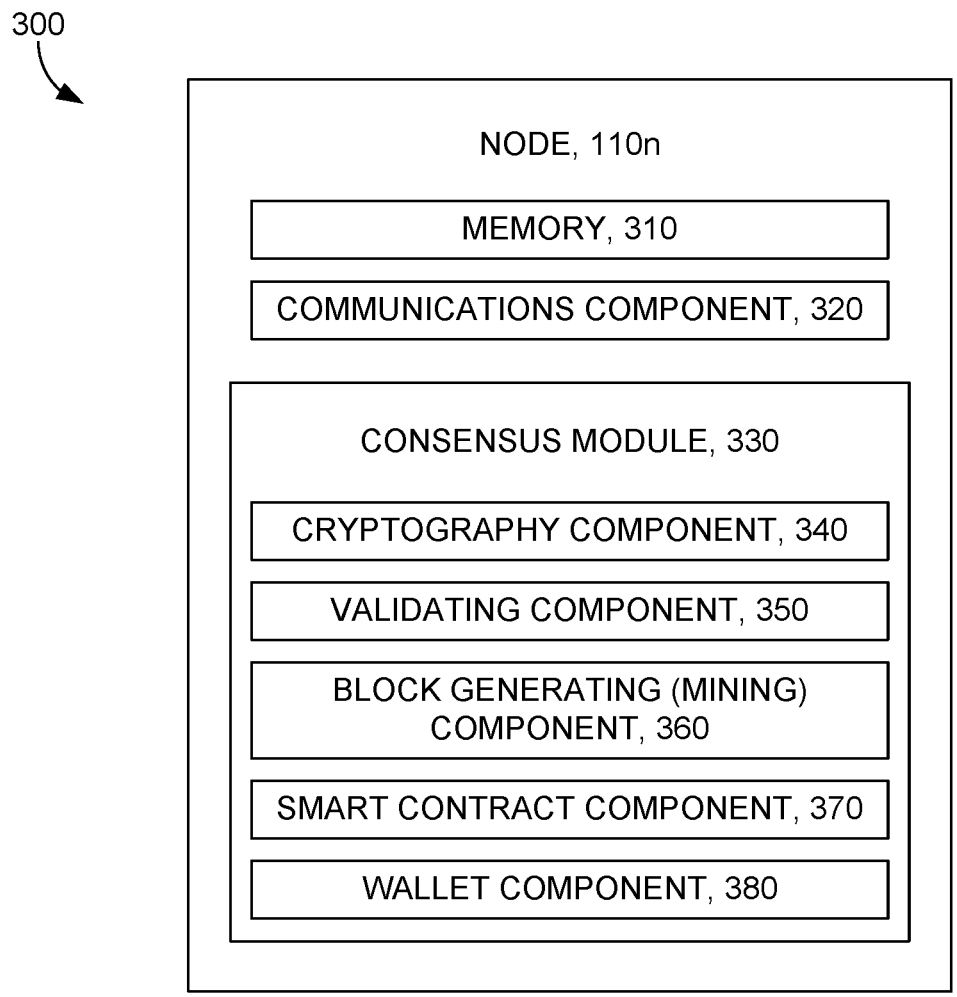
FIG. 3 is a block diagram depicting an exemplary node of a distributed ledger network in accordance with some embodiments of the present invention.

Turning now to FIG. 3, a block diagram 300 is provided depicting exemplary components of a node 110n (or designated node) in accordance with the present disclosure. The node 110n depicted in FIG. 3 can include, among other things, a memory 310, a communications component 320, and a consensus module 330. The memory 310 can include any type of memory, such as a hardware storage device, random access memory (RAM), a cache, read-only memory (ROM), and the like, including any combination thereof. The memory 310 can be employed to store executable computer code that, when executed by one or more processors of the node 110n, perform operations defined and/or implemented within the consensus module described herein. The memory 310 can also be employed to store data communicated from other nodes 110n, clients 230, 230n and/or servers 240, such as those described in accordance with FIG. 2. The communicated data stored in memory can include, among other things, transactions, one or more blocks of a blockchain, determinations of validity, determinations of authentication/verification, unique identifiers and/or IP addresses of one or more nodes 110n, and other types of electronic data not limited to the foregoing.

The communications component 320 can include any type of communications device that enables the node 110n to communicate with other nodes 110n, clients 230, 230n and/or servers 240, such as those described in accordance with FIG. 2. Communications can be facilitated utilizing wired or wireless communications, and can employ any short or long-range communications technology including, but not limited to, LANs, WANs, Ethernet, the Internet, WiFi, Bluetooth, NFC, optics (e.g., QR codes, Infrared), Zigbee, radio, RFIDs, and the like.

The consensus module 330 can include any number of components or subcomponents that, together with the memory 310 and communications component 320, enable the node 110n to operate as a peer node (or a peer to other "designated" nodes) in a distributed ledger network, such as distributed ledger network 100 described in accordance with FIG. 1. It should be understood that this and other arrangements described herein are set forth only as examples. Other arrangements and elements (e.g., machines, interfaces, functions, orders, groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The cryptography component 340 is used (e.g., by the validating component 350, the block generating component 360, and/or the wallet component 380) for encrypting and/or decrypting data for digital authentication and/or verification, for storage on the blockchain, and/or for retrieval from the blockchain. Any suitable encryption scheme is possible, such as asymmetric cryptography (i.e., public-private key cryptography). Generally, the cryptography component 340 can generate cryptographic hashes of data utilizing a common-to-all-nodes hashing algorithm (e.g., SHA256, Scrypt, etc.). In some embodiments, transactional data can be shielded by cryptography component 340 encrypting or otherwise making transactional data uninterpretable before storing on the blockchain. For example, transactional data can be encrypted by a public key of a participant authorized to decrypt the data with a corresponding private key. When multiple participants are authorized to view the data, multiple copies can be stored on the blockchain, each copy encrypted with a different public key for a corresponding authorized participant. This encryption scheme is meant merely as an example, and any other suitable scheme may be implemented.

The validating component 350 validates transactions by digitally authenticating digital signatures of transactions with the public key of a sending wallet address and verifying "possession" and/or liquidity based on a locally-performed cross-reference of the blockchain for records associated with the public key (of the sending wallet address). That is, validating component 350 validates that the sender is who she says she is, and validates that the sender has what she is trying to transfer.

The block generating component 360 is configured to participate in the process of adding a transaction to the blockchain. Generally, the block generating component 360 can generate a block for storage on the blockchain. Block generation can be implemented in a variety of ways based on a consensus algorithm including, but not limited to, proof of work, proof of stake, proof of authority, practical Byzantine Fault Tolerance, or Federated Byzantine Agreements.

The smart contract component 360 is configured to coordinate with the other nodes in the distributed ledger network to execute a smart contract. Generally, a smart contract component 360 on each node (or designated node) can verify the occurrence of a triggering event until at least a consensus has done so. The smart contract component 360 can verify occurrence based on data received or retrieved by the node. As such, the smart contract component 360 can execute code for a smart contract that monitors for triggering events (e.g., agreement, performance, breach, condition precedent, etc.) and enforces a corresponding contractual provision by automatically performing the provision (e.g., performance, counter-performance, remedies, etc.) or other otherwise performing a designated transaction element (e.g., query and retrieval of information from a participant node).

The wallet component 370 can securely store the private key of a user of node 110n. In some embodiments, the wallet component 370 can filter (e.g., from a locally-stored copy of the blockchain) and present information about transactions associated with corresponding public keys, so that the user can view transactions that are relevant to the user. The wallet component 370 can be associated with a GUI configured to present a list of relevant transactions. The wallet component 370 can receive inputs from a user to generate transactions, and can sign those transactions with the secured private key of the user. In some embodiments, the wallet component 370 can provide updates regarding a relevant transaction status via the GUI.

Exemplary Smart Contract Platform

Figure 4:
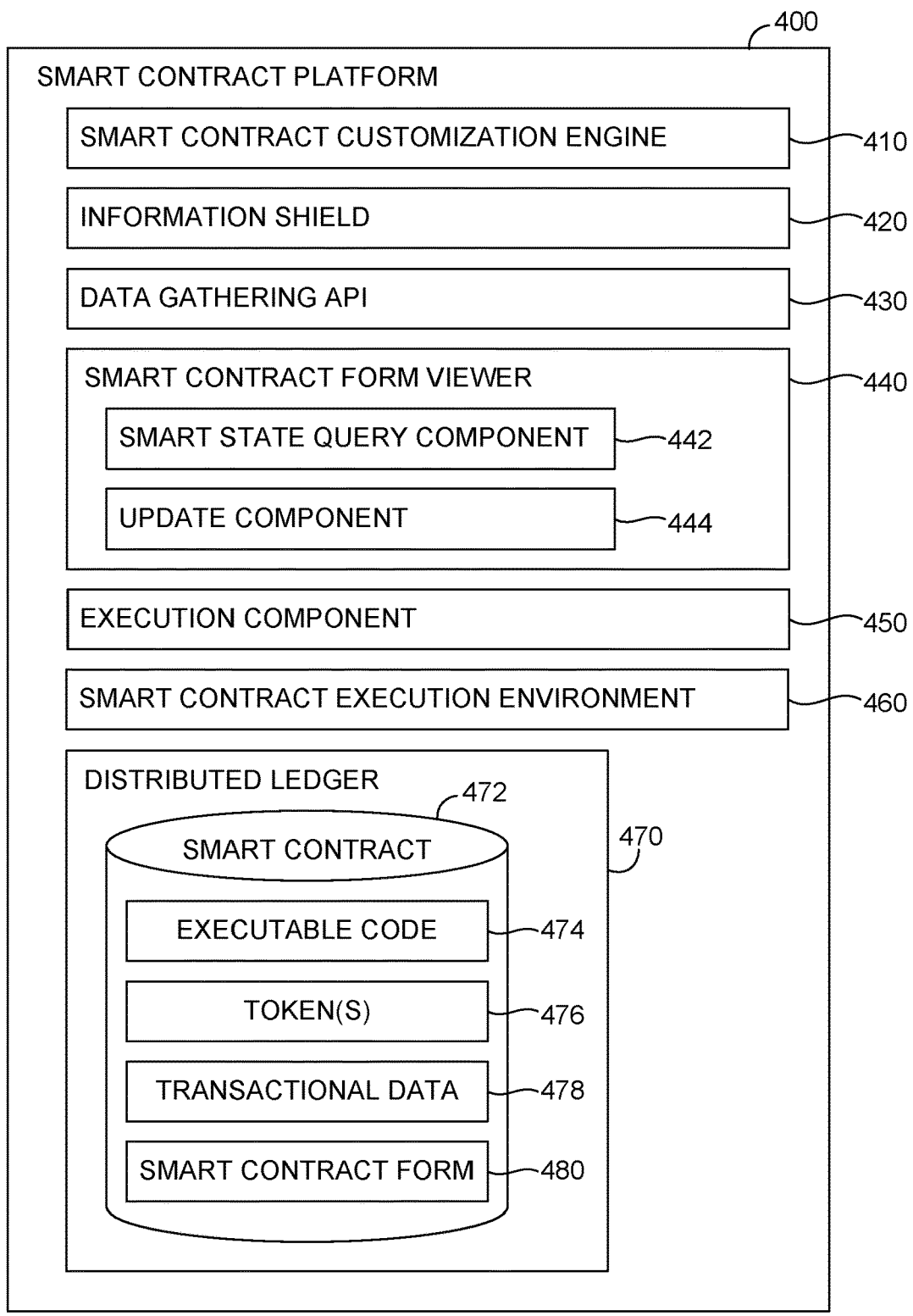
FIG. 4 is a block diagram depicting an exemplary smart contract platform according to some embodiments of the present invention.

Referring now to FIG. 4, a block diagram depicting an exemplary smart contract platform 400 according to some embodiments of the present invention is shown. Generally, smart contract platform 400 facilitates the creation, execution and verification of customized smart contracts. Smart contract platform 400 may operate on one or more nodes of a distributed ledger network. Each node can be any kind of computing device capable of facilitating the creation, execution and verification of customized smart contracts. For example, in an embodiment, each node can be a computing device such as computing device 1000, as described below with reference to FIG. 10. In various embodiments, nodes can be can be a personal computer (PC), a laptop computer, a workstation, a mobile computing device, a PDA, a cell phone, or the like.

Generally, the smart contract platform 400 provides an interface that facilitates the creation, execution and verification of customized smart contracts. More specifically, the smart contract platform 400 can facilitate the creation, execution and verification of smart contracts that include logic that can query and fetch designated information from third party sources or other participants to a smart contract. As illustrated, smart contract platform 400 includes a smart contract customization engine 410, an information shield 420, a data gathering API 430, a smart contract form viewer 440, an execution interface 450, a smart contract execution environment 460, and a distributed ledger 470. Any or all of these components may be incorporated or integrated, partially or entirely, into an application, or an add-on or plug-in to an application, such as ADOBE SIGN. The application may generally be any application capable of facilitating the creation, execution and verification of customized smart contracts, and may be a stand-alone application, a mobile application, a web application, or the like. In some implementations, the application(s) comprises a web application, which can run in a web browser, and could be hosted at least partially server-side. In addition, or instead, the application (s) can comprise a dedicated application. In some cases, the application can be integrated into the operating system (e.g., as a service). Although the smart contract platform 400 is generally discussed herein being associated with an application, in some cases, the smart contract platform 400, or some portion thereof, can be additionally or alternatively integrated into the operating system (e.g., as a service) and/or a server (e.g., a remote server).

The smart contract customization engine 410 enables users to create customized workflows (smart contracts) that can initiate and execute a series of transaction elements for the workflow (e.g., conditions precedent, performance of obligations, etc.). The smart contract customization engine 410 can provide a front-end interface (e.g., a GUI) that allows a user to select and arrange desired transaction elements for a smart contract, and the smart contract customization engine 410 can generate a corresponding smart contract using a syntax that is compatible with the smart contract execution environment 460. The smart contract customization engine 410 may be configured to automatically incorporate transaction elements (e.g., conditions precedent) to a smart contract. For example, a requirement can be specified that required transactional data for a particular smart contract and/or by a particular participant (e.g., identification information, financial information, etc.) be retrieved and/or verified. As such, a specified requirement may be automatically added as a transaction element (e.g., condition precedent) in a workflow. A transaction element may be designated as required based on the type of smart contract (e.g., loans, insurance policies, purchase agreement, real estate transfer, etc.), a custom requirement designated by a participant to a smart contract, a regulatory requirement, information about a participant to a smart contract (e.g., age, credit history, citizenship, employment history, income, etc.), or otherwise.

Often times, transactional data associated with a smart contract will be of a sensitive nature. For example, when a smart contract requires retrieval or verification of transactional data such as identification information, financial information, and the like, the information shield 420 can be used to avoid publication of such sensitive information on the blockchain. When a user completes generation of a smart contract (e.g., signs a loan application), or otherwise initiates execution of a smart contract, the information shield 420 can generate an authorization token and issue it to the custodian of the information to be retrieved (e.g., via the data gathering API 430), thereby authorizing access, retrieval and/or verification of the information. The token and/or proof of transfer of the token may be stored in the distributed ledger. In this manner, the information shield 420 can issue tokens to a participant node (e.g., banks, employer, IRS, etc.), and the token(s) can authorize disclosure of (or access to) sensitive information according to logic and/or instructions associated with the token, such as logic and/or instructions contained in parameters and/or metadata associated with a corresponding transaction (e.g., the last transfer of the token), and/or contained in an associated smart contract. For example, disclosure of (or access to) sensitive information may be authorized when a requesting participant's wallet is verified, possession of the authorization token is verified (e.g., the token has not expired or been subsequently transferred), and permissions associated with the token are verified (e.g., permissions reflected by the associated logic and/or instructions have not changed).

In some embodiments, when a participant node receives a token, the participant node can perform a corresponding transaction element indicated by logic and/or instructions associated with the token (e.g., by verifying the accuracy of financial information). In some embodiments, the requested transaction element can be executed automatically. In these embodiments, an information shield on the participant node can be configured to access a local system coupled to the participant node, and access/verify any required transactional data (e.g., W2s, account balances, etc.). In some embodiments, the requested transaction element can be performed by prompting a representative of the participant to manually enter the transactional data into, or upload the transactional data via, a field of an associated smart contract form, as described in more detail below. If the information shield on the participant node determines that the transaction element is successfully completed, the information shield can issue a token indicating the successful completion. The participant node can provide the token and/or proof of transfer to nodes of a distributed ledger network via one or more communication links established with the participant node (e.g., using paired data gathering APIs).

Generally, a token can be issued as a record that a certain number of number of transactional elements did in fact occur. The token and/or proof of transfer can be stored on the blockchain using a consensus algorithm, so that possession and/or proof of transfer of the token is immutable. Generally, a corresponding transaction may include some associated transactional data (e.g., logged data, timestamps, etc.), and/or may omit some associated transactional data (e.g., W2s, account balances, proof of employment, etc.). By omitting associated transactional data, a token can be used to shield sensitive information while providing verifiable proof that the associated transactional element(s) occurred.

Additionally or alternatively, transactional data may be stored on the blockchain. In some embodiments, some or all of the transactional data made available on the blockchain may be shielded by encrypting the transactional data or otherwise making it uninterpretable. In this sense, some transactions and/or transactional data (e.g., identification of a plot of land, identification of parties, proof of transfer, etc.) may be publically visible and interpretable, some transactions and/or transactional data may be publically visible but not interpretable (e.g., employment records, residential history, etc.), and some transactions and/or transactional data may not be publically visible or interpretable (e.g., personal bank records or other financial information).

The data gathering API 430 provides an interface through which smart contracts can query third party sources or other participants and collect designated transactional data and/or tokens. Generally, a smart contract platform (e.g., corresponding to the smart contract platform 400), or some portion thereof, can be installed on one or more nodes of a third party partner (e.g., banks, government agencies, employers, realtor associations, etc.) or other participant to a smart contract. As such, a corresponding data gathering API can be configured on a participant node to facilitate establishing communication links between nodes in a distributed ledger network. For example, the data gathering API 430 can establish a communications link with a corresponding data gathering API on a participant node, and the participant node can provide transactional data and/or tokens via the communications link.

In some embodiments, a smart contract form associated with the smart contract can be presented in a smart contract form viewer 440 of the smart contract platform 400. While the smart contract may be comprised of computer code, a corresponding smart contract form can express the corresponding contractual provisions in natural language. Generally, a smart contract form is a document that represents the state of a smart contract at a given point in time. The smart contract form may include fields that are linked to associated transactional data of the smart contract to facilitate the presentation, entry and/or verification of associated transactional data. When the smart contract form is viewed with the smart contract form viewer 440, associated transactional data can be presented. Upon entry or verification of transactional data (e.g., via a digital signature), the transactional data can be transmitted to the smart contract for processing.

The smart contract form viewer 440 can present a smart contract form, transactional data, and/or an associated field in various ways. Depending on the state of the smart contract, some transactional data may not yet exist (e.g., transactional data has not yet been submitted). As such, corresponding fields in the smart contract form may be blank. When associated transactional data exists, corresponding fields in the smart contract form may be populated in various ways. For example, transactional data used to populated a field may be stored and accessed from the smart contract form, an associated block of a distributed ledger, a participant system, or otherwise. The smart contract form viewer can present shielded transactional data and/or an associated field in various ways. For example, in embodiments in which transactional data is encrypted, a smart contract form viewer installed on a node of an authorized user can decrypt (e.g., using asymmetric key cryptography) and present the transactional data in the field, or in association with the field (e.g., click to reveal). When the user is not authorized to view the transactional data, or in embodiments in which a token provides proof that corresponding transactional data has been provided or verified without providing access to the underlying transactional data, the smart contract form can be configured to present an indication that the transactional data has been verified and/or is unavailable (e.g., by redaction, blank field, notification, or the like). In this manner, the smart contract form viewer 440 can be used by an authorized user to view a smart contract form associated with a particular smart contract.

Consider, by way of nonlimiting example, an insurance smart contract, where multiple participants are involved and operate nodes in a distributed ledger network. An insurance policy may be associated with a smart contract form with fields that need to be filled out or signed. When a triggering event occurs (e.g., submission of a claim), participants (e.g., a policy holder, appraiser, mechanic/contractor, insurance company, etc.) designated by an underlying smart contract may be required to enter corresponding claim information so that the claim can be paid. The participants can utilize the smart contract form viewer 440 to access and view the policy, and the policy can be linked to the underlying smart contract. The smart contract can monitor for the occurrence of transaction elements (e.g., the entry of transactional data and/or digital signatures into fields of the smart contract form by an authorized participant). Once the requisite transaction elements of the smart contract are met (i.e., all fields of the smart contract form are completed), a corresponding obligation can be automatically performed (i.e., the claim is paid out).

In the embodiment illustrated in FIG. 4, upon receiving a request to load a particular document, the smart contract form viewer 440 can query the distributed ledger 470 to access and verify the state of a smart contract 472 (including any associated tokens 476 and/or transactional data 478), perform any necessary decryptions, and trigger a presentation of the corresponding smart contract form on the smart contract form viewer 442. In some embodiments, the smart state query component 442 can check for state updates (e.g., periodically, repetitively, upon a predefined schedule, on demand, upon receiving a notification of an update, etc.). If an update is available, the smart state query component 442 can query the distributed ledger 470 to access and present the corresponding updated information.

In some embodiments, an authorized user may manually enter transactional data into a corresponding field of the smart contract form using the smart contract form viewer 440. In some situations, an authorized user may enter a verification such as a digital signature into a corresponding field of the smart contract form. In these and other situations, the update component 444 can be configured to confirm that the user is authorized to complete a particular field (e.g., by authentication, authorization, etc.). The update component 444 can be configured to disallow entry into a particular field by an unauthorized user. Further, the update component 444 can be configured to allow entry by an authorized user, and to cause generation and/or transmission of a corresponding token, transactional data, or some combination to one or more components. For example, the update component 444 may cause generation or transmission of a token and/or transactional data to the execution interface 450 for storage on the blockchain, to the data gathering API 430 for provision to a participant node in the distributed ledger network, and the like.

The execution interface 450 is configured to serve as the interface for the smart contract execution environment 460 by making the appropriate calls to the smart contract execution environment 460. The execution interface 450 can pass tokens, transactional data, and/or other information or between the smart contract execution environment 460 and the components of the smart contract platform 400. Although depicted as a separate component, functionality of the execution interface 450 may additionally or alternatively be incorporated into one or more of the components of the smart contract platform 400 (e.g., the smart contract customization engine 410, the information shield 420, the data gathering API 430, the smart contract form viewer 440, the smart contract execution environment 460, etc.).

Generally, the smart contract execution environment 460 provides functionality for executing smart contracts on the blockchain. The smart contract execution environment 460 accesses a smart contract 472 stored in the distributed ledger 470, executes the smart contract, monitors for triggering events, executes obligations, and generates and validates blocks, transaction elements, tokens and/or transactional data. The smart contract execution environment 460 uses a consensus algorithm to update and verify updates to the smart contract (e.g., code updates, state updates reflected by tokens and/or transactional data, etc.) and store the updates to the blockchain. The smart contract execution environment 460 communicates with corresponding smart contract execution environments operating on external nodes to support the consensus algorithm. Generally, independent third parties can earn money by performing data mining services to support block generation and consensus determination. Any suitable smart contract execution environment may be implemented, including ETHEREUM®, HYPERLEDGER® FABRIC, NEM, STELLAR, IOLITE, NEBLIO, AND LISK®, to name a few.

Generally, the distributed ledger 470 stores and replicates smart contracts 472 on each participating node. In various embodiments, different elements of a smart contract and/or a corresponding smart contract form can be stored in the distributed ledger 470 (e.g., on the blockchain). For example, a smart contract may be represented by executable code 474 that implements the terms of the contract. In some embodiments, updates to the code and/or corresponding terms to the contract can be stored in the distributed ledger 470.

In some embodiments, tokens 476 can be generated to indicate that a certain number of number of transactional elements occurred. For example, one or more transactional elements can each be associated with one of a plurality of public keys, and a token may be issued (e.g., signed) with a particular private key corresponding to a performed transactional element(s). In this manner, a verified digital token can indicate that one or more associated transaction elements have been successfully completed, such as verification or provision of transactional data (e.g., W2s, account balances, etc.). In another example, a participant may spend a certain number of crypto tokens to complete one or more transactional elements (e.g., to complete a loan application). In some embodiments, an authorization token can indicate that disclosure of or access to sensitive information is authorized according to logic and/or instructions associated with the token (e.g., contained in parameters or metadata associated with a transaction, and/or contained in an associated smart contract). A token may indicate that any number of transactional elements have been successfully completed. As such, one or more tokens 476 and/or proof of their transfer may be stored in the distributed ledger 470.

While a token may provide an indication that a certain number of number of transactional elements occurred, associated transactional data 478 may additionally or alternatively be stored in the distributed ledger 470. The transactional data 478 may be encrypted or otherwise made uninterpretable by an unauthorized user.

In some embodiments, a smart contract form 480 corresponding to the smart contract 472 may be stored in the distributed ledger 470 such that updates to the form must be verified by consensus. However, this need not be the case, and in some embodiments, the smart contract form may be stored external to the distributed ledger 470 and configured to import data (e.g., terms reflected by code 474, tokens 476, transactional data 478, etc.) from the distributed ledger 470.

Figure 5:
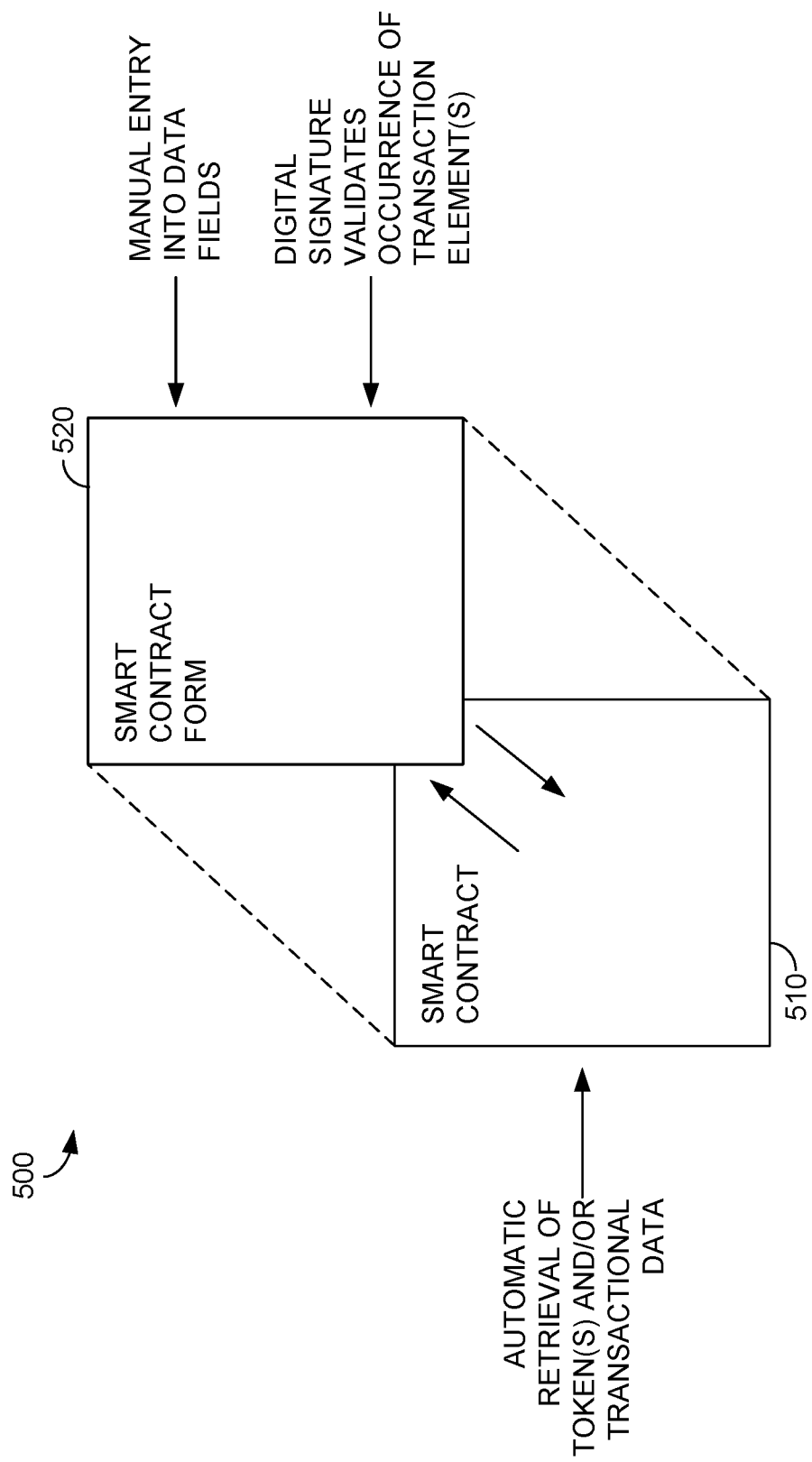
FIG. 5 is a block diagram depicting an exemplary smart contract and corresponding smart contract form in accordance with some embodiments of the present invention.

Turning now to FIG. 5, FIG. 5 depicts an exemplary smart contract 510 and corresponding smart contract form 520 in accordance with some embodiments of the present invention. Generally, smart contract form 520 provides a natural language version of the underlying smart contract 510. For example, while the smart contract 510 may be comprised of computer code, the smart contract form 520 can express the corresponding contractual provisions in natural language. The smart contract form 520 includes various fields that are linked to the smart contract 510. For example, the smart contract form 520 can accept an entry of transactional data into one or more fields of the smart contract form 520 by an authorized user. For example, in some embodiments, the smart contract form 520 can accept a digital signature by an authorized user that validates the occurrence of some transaction element. In another example, the smart contract form 520 can accept a document upload or other entry of transactional data from an authorized user. The entered transactional data is transmitted to the smart contract 510, which monitors for triggering events (e.g., signatures, provision of transactional data, etc.). In some embodiments, the smart contract 510 is configured to automatically query and retrieve information (e.g., token(s), transactional data, etc.) from a third party source or other participant to a smart contract. Query and retrieval may, but need not, be performed upon detection of a triggering event (e.g., creation of a smart contract, detection of a condition precedent, etc.).

Figure 6:
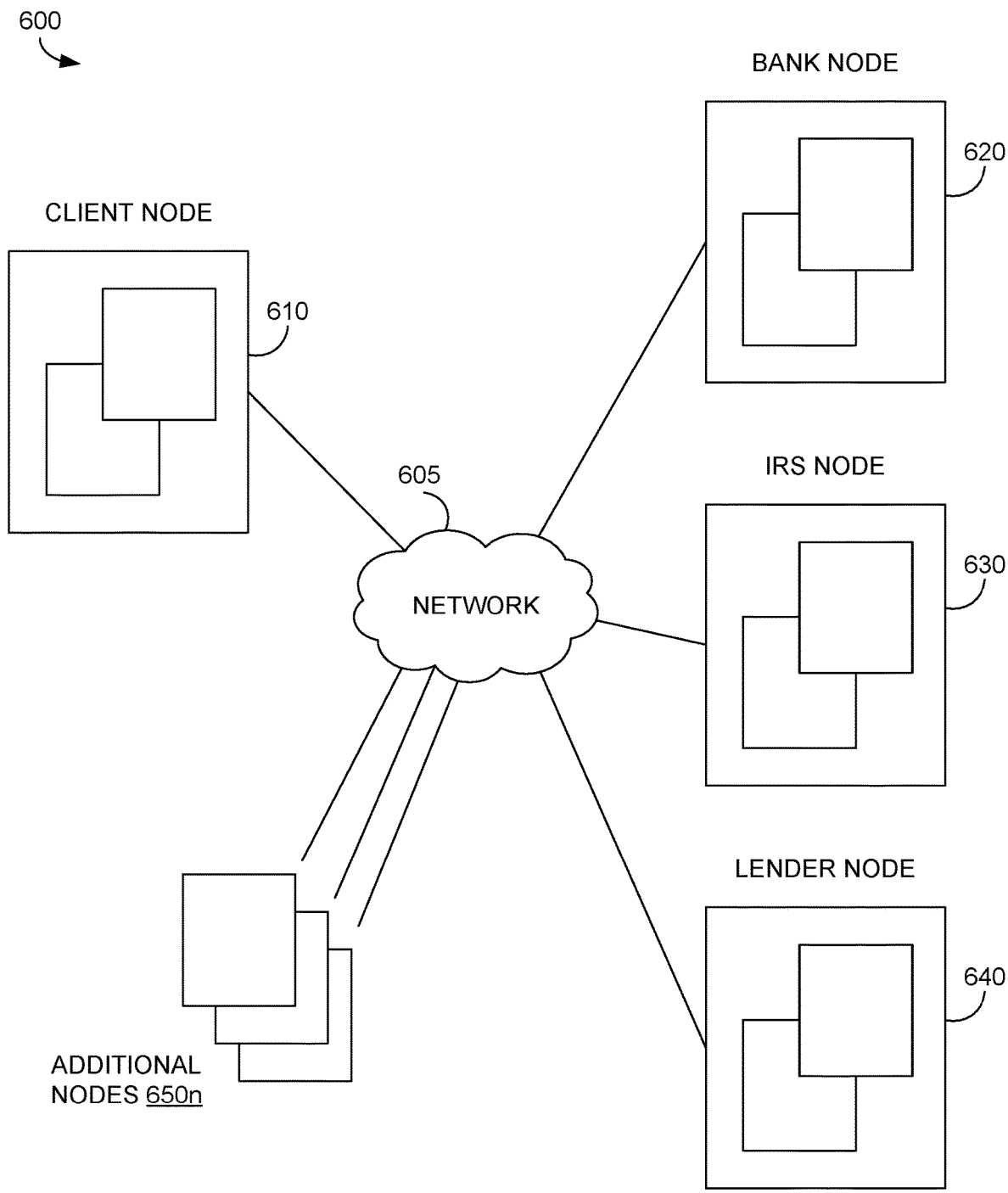
FIG. 6 is a system diagram of an implementation of a customized smart contract system in accordance with some embodiments of the present invention.

Turning now to FIG. 6, FIG. 6 depicts an implementation of a customized smart contract system in accordance with some embodiments of the present invention. The system includes various nodes of a distributed ledger network, including a client node 610, a bank node 620, an IRS node 630, a lender node 640, and additional nodes 650n. The nodes may communicate with each other via a network 605, which may include, without limitation, one or more local area networks (LANs) and/or wide area networks (WANs). Such networking environments are commonplace in offices, enterprise-wide computer networks, intranets, and the Internet.

Each node may operate a smart contract platform (e.g., the smart contract platform 400 of FIG. 4). A prospective borrower operating the client node 610 can use the smart contract platform on the client node 610 to generate a loan application. The borrower can customize and the desired terms of the loan and sign the loan application using the smart contract platform. Upon signing, the smart contract platform automatically generates a corresponding smart contract, deploys the smart contract to the distributed ledger network, and issues tokens to each of the bank node 620 and the IRS node 630 to authorize the bank node 620 and the IRS node 630 to disclose the prospective borrower's account statements and W2s, respectively. The bank node 620 and the IRS node 630 may be configured to automatically retrieve this transactional data, to prompt a representative to provide the transactional data, and/or to verify that the transactional data meets one or more designated requirements. The transactional data and/or a corresponding token can be issued and stored on the blockchain (e.g., based on a determined consensus among the nodes of the distributed ledger network).

The client node 610, the bank node 620, the IRS node 630, and/or the lender node 640 can be authorized to access and view the prospective borrower's account statements and W2 from the blockchain using a smart contract form viewer. Additional nodes 650n may be unauthorized to access and view the account statements and W2 from the blockchain. As such, a smart contract form viewer on a node in the distributed ledger network may be configured to allow access to a smart contract form and/or particular transactional data by an authorized user and to disallow access by an unauthorized user, as described in more detail above. Once the smart contract detects that the requisite transaction elements have occurred (e.g., the requisite transactional data has been provided and verified by the bank node 520 and the IRS node 530), the loan may automatically be issued to a designated borrower account by the lender node 540.

Exemplary Flow Diagrams

Figure 7:
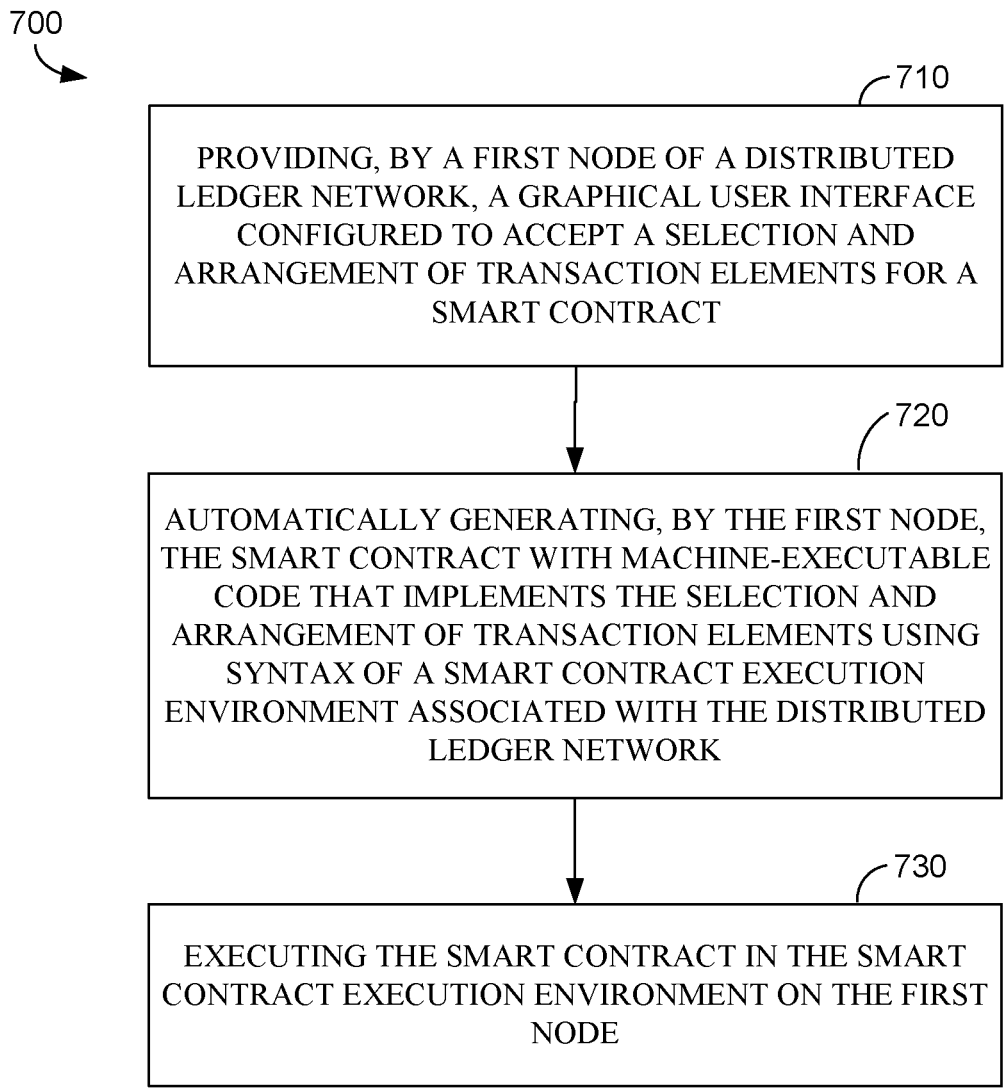
FIG. 7 is a flow diagram showing a method for customizing a smart contract in accordance with some embodiments of the present invention.
Figure 8:
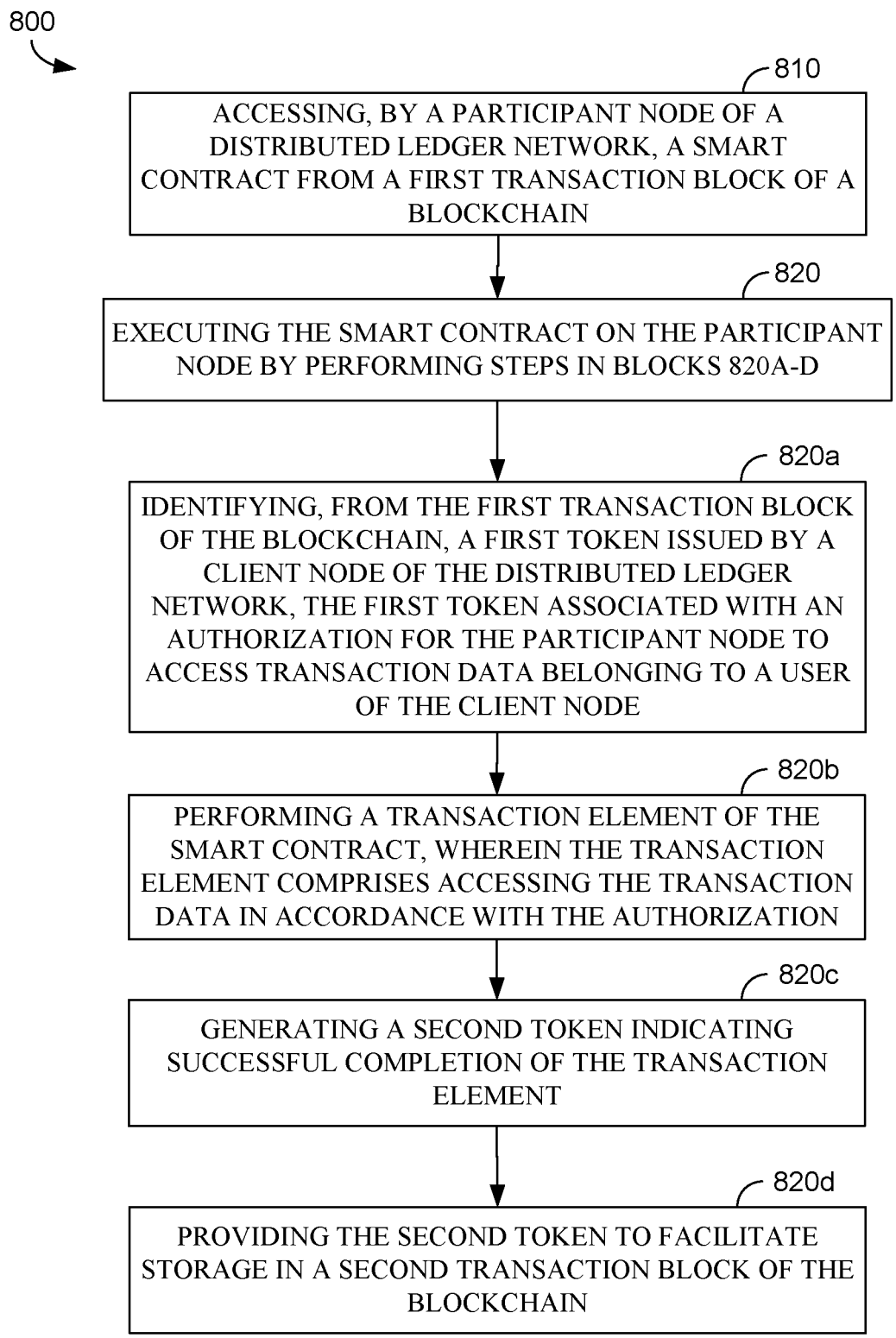
FIG. 8 is a flow diagram showing a method for executing a smart contract in accordance with some embodiments of the present invention.

With reference now to FIGS. 7-8, flow diagrams are provided illustrating methods for customizing and/or executing a smart contract. Each block of the methods 700 and 800 and any other methods described herein comprise a computing process performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few.

Turning initially to FIG. 7, FIG. 7 illustrates a method 700 for customizing a smart contract, in accordance with embodiments described herein. Initially at block 710, a graphical user interface configured to accept a selection and arrangement of transaction elements for a smart contract is provided by a first node of a distributed ledger network. At block 720, the smart contract is automatically generated by the first node with machine-executable code that implements the selection and arrangement of transaction elements using syntax of a smart contract execution environment associated with the distributed ledger network. At block 730, the smart contract is executed in the smart contract execution environment on the first node.

Turning now to FIG. 8, FIG. 8 illustrates a method 800 for executing a smart contract, in accordance with embodiments described herein. Initially at block 810, a smart contract is accessed, by a participant node of a distributed ledger network, from a first transaction block of a blockchain. At block 820, the smart contract is executed on the participant node by performing steps in blocks 820a-d. At block 820a, a first token issued by a client node of the distributed ledger network is identified from the first transaction block of the blockchain. The first token is associated with an authorization for the participant node to access transaction data belonging to a user of the client node. At block 820b, a transaction element of the smart contract is performed. The transaction element comprises accessing the transaction data in accordance with the authorization. At block 820c, a second token is generated indicating successful completion of the transaction element. At block 820d, the second token is provided to facilitate storage in a second transaction block of the blockchain.

Exemplary Computing Environment

Figure 9:
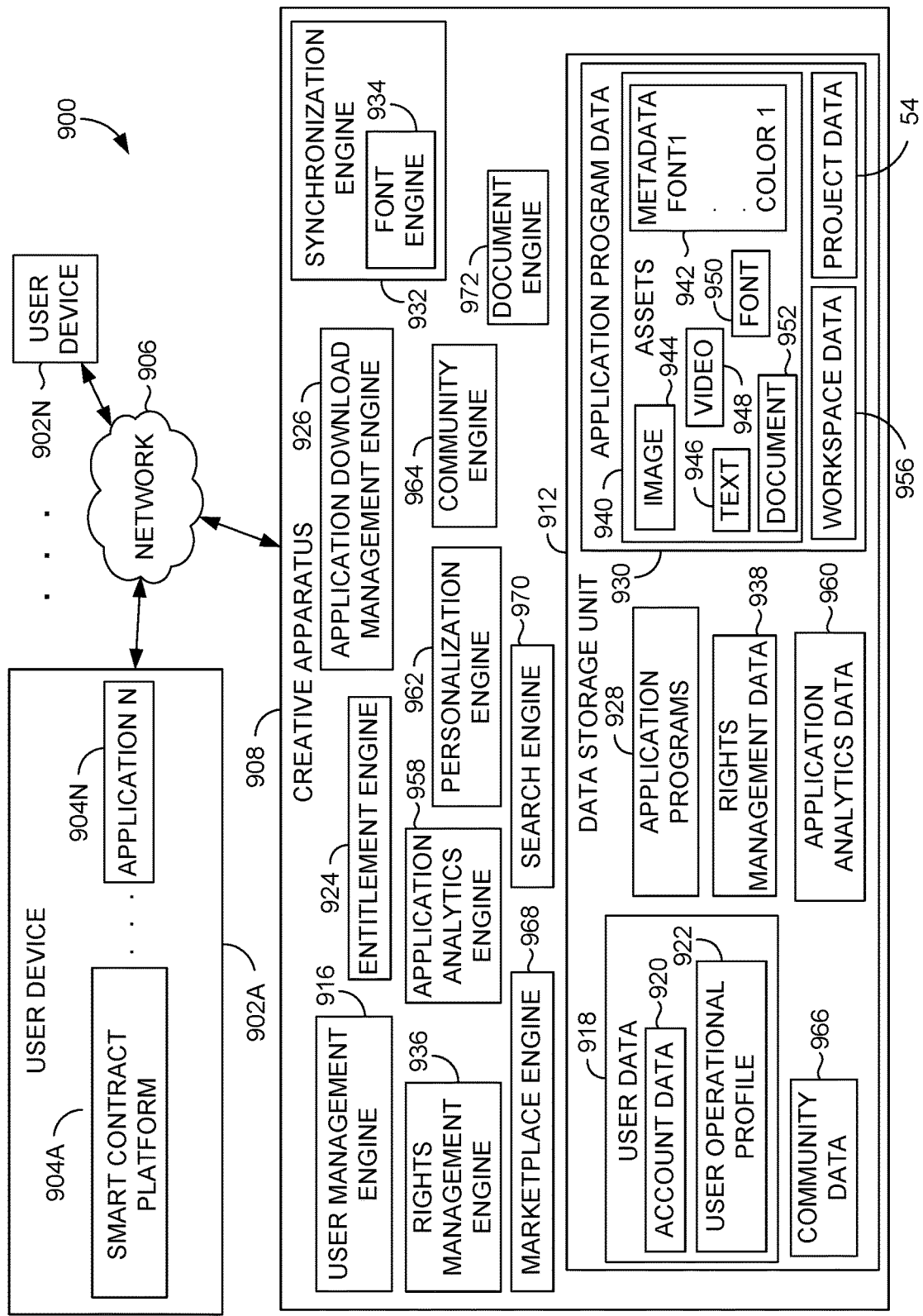
FIG. 9 is a block diagram of an exemplary computing environment in which embodiments of the invention may be employed.

FIG. 9 is a diagram of environment 900 in which one or more embodiments of the present disclosure can be practiced. Environment 900 includes one or more user devices, such as user devices 902A-902N. Examples of user devices include, but are not limited to, a personal computer (PC), tablet computer, a desktop computer, cellular telephone, a processing unit, any combination of these devices, or any other suitable device having one or more processors. Each user device includes at least one application supported by creative apparatus 908. It is to be appreciated that following description may generally refer to user device 902A as an example and any other user device can be used.

A user of the user device can utilize various products, applications, or services supported by creative apparatus 908 via network 906. User devices 902A-902N can be operated by various users. Examples of the users include, but are not limited to, creative professionals or hobbyists who use creative tools to generate, edit, track, or manage creative content, advertisers, publishers, developers, content owners, content managers, content creators, content viewers, content consumers, designers, editors, any combination of these users, or any other user who uses digital tools to create, edit, track, or manage digital experiences.

A digital tool, as described herein, includes a tool that is used for performing a function or a workflow electronically. Examples of a digital tool include, but are not limited to, content creation tool, content editing tool, content publishing tool, content tracking tool, content managing tool, content printing tool, content consumption tool, any combination of these tools, or any other tool that can be used for creating, editing, managing, generating, tracking, consuming or performing any other function or workflow related to content. A digital tool includes creative apparatus 908.

Digital experience, as described herein, includes experience that can be consumed through an electronic device. Examples of the digital experience include content creating, content editing, content tracking, content publishing, content posting, content printing, content managing, content viewing, content consuming, any combination of these experiences, or any other workflow or function that can be performed related to content.

Content, as described herein, includes electronic content. Examples of the content include, but are not limited to, image, video, website, webpage, user interface, menu item, tool menu, magazine, slideshow, animation, social post, comment, blog, data feed, audio, advertisement, vector graphic, bitmap, document, any combination of one or more content, or any other electronic content.

User devices 902A-902N can be connected to creative apparatus 908 via network 906. Examples of network 906 include, but are not limited to, internet, local area network (LAN), wireless area network, wired area network, wide area network, and the like.

Creative apparatus 908 includes one or more engines for providing one or more digital experiences to the user. Creative apparatus 908 can be implemented using one or more servers, one or more platforms with corresponding application programming interfaces, cloud infrastructure and the like. In addition, each engine can also be implemented using one or more servers, one or more platforms with corresponding application programming interfaces, cloud infrastructure and the like. Creative apparatus 908 also includes data storage unit 912. Data storage unit 912 can be implemented as one or more databases or one or more data servers. Data storage unit 912 includes data that is used by the engines of creative apparatus 908.

A user of user device 902A visits a webpage or an application store to explore applications supported by creative apparatus 908. Creative apparatus 908 provides the applications as a software as a service (SaaS), or as a standalone application that can be installed on user device 902A, or as a combination. The user can create an account with creative apparatus 908 by providing user details and also by creating login details. Alternatively, creative apparatus 908 can automatically create login details for the user in response to receipt of the user details. In some embodiments, the user is also prompted to install an application manager. The application manager enables the user to manage installation of various applications supported by creative apparatus 908 and also to manage other functionalities, such as updates, subscription account and the like, associated with the applications. User details are received by user management engine 916 and stored as user data 918 in data storage unit 912. In some embodiments, user data 918 further includes account data 920 under which the user details are stored.

The user can either opt for a trial account or can make payment based on type of account or subscription chosen by the user. Alternatively, the payment can be based on product or number of products chosen by the user. Based on payment details of the user, user operational profile 922 is generated by entitlement engine 924. User operational profile 922 is stored in data storage unit 912 and indicates entitlement of the user to various products or services. User operational profile 922 also indicates type of user, i.e. free, trial, student, discounted, or paid.

In some embodiment, user management engine 916 and entitlement engine 924 can be one single engine performing the functionalities of both the engines.

The user can then install various applications supported by creative apparatus 908 via an application download management engine 926. Application installers or application programs 928 present in data storage unit 912 are fetched by application download management engine 926 and made available to the user directly or via the application manager. In one embodiment, an indication of all application programs 928 are fetched and provided to the user via an interface of the application manager. In another embodiment, an indication of application programs 928 for which the user is eligible based on user's operational profile are displayed to the user. The user then selects application programs 928 or the applications that the user wants to download. Application programs 928 are then downloaded on user device 902A by the application manager via the application download management engine 926. Corresponding data regarding the download is also updated in user operational profile 922. Application program 928 is an example of the digital tool. Application download management engine 926 also manages the process of providing updates to user device 902A.

Upon download, installation and launching of an application program, in one embodiment, the user is asked to provide the login details. A check is again made by user management engine 916 and entitlement engine 924 to ensure that the user is entitled to use the application program. In another embodiment, direct access is provided to the application program as the user is already logged into the application manager.

The user uses one or more application programs 904A-904N installed on the user device to create one or more projects or assets. In addition, the user also has a workspace within each application program. The workspace, as described herein, includes setting of the application program, setting of tools or setting of user interface provided by the application program, and any other setting or properties specific to the application program. Each user can have a workspace. The workspace, the projects, and/or the assets can be stored as application program data 930 in data storage unit 912 by synchronization engine 932. Alternatively or additionally, such data can be stored at the user device, such as user device 902A.

Application program data 930 includes one or more assets 940. Assets 940 can be a shared asset which the user wants to share with other users or which the user wants to offer on a marketplace. Assets 940 can also be shared across multiple application programs 928. Each asset includes metadata 942. Examples of metadata 942 include, but are not limited to, font, color, size, shape, coordinate, a combination of any of these, and the like. In addition, in one embodiment, each asset also includes a file. Examples of the file include, but are not limited to, image 944, text 946, video 948, font 950, document 952, a combination of any of these, and the like. In another embodiment, an asset only includes metadata 942.

Application program data 930 also include project data 954 and workspace data 956. In one embodiment, project data 954 includes assets 940. In another embodiment, assets 940 are standalone assets. Similarly, workspace data 956 can be part of project data 954 in one embodiment while it may be standalone data in other embodiment.

A user can operate one or more user device to access data. In this regard, application program data 930 is accessible by a user from any device, including a device which was not used to create assets 940. This is achieved by synchronization engine 932 that stores application program data 930 in data storage unit 912 and enables application program data 930 to be available for access by the user or other users via any device. Before accessing application program data 930 by the user from any other device or by any other user, the user or the other user may need to provide login details for authentication if not already logged in. In some cases, if the user or the other user are logged in, then a newly created asset or updates to application program data 930 are provided in real time. Rights management engine 936 is also called to determine whether the newly created asset or the updates can be provided to the other user or not. Workspace data 956 enables synchronization engine 932 to provide a same workspace configuration to the user on any other device or to the other user based on rights management data 938.

In various embodiments, various types of synchronization can be achieved. For example, the user can pick a font or a color from user device 902A using a first application program and can use the font or the color in a second application program on any other device. If the user shares the font or the color with other users, then the other users can also use the font or the color. Such synchronization generally happens in real time. Similarly, synchronization of any type of application program data 930 can be performed.

In some embodiments, user interaction with applications 904 is tracked by application analytics engine 958 and stored as application analytics data 960. Application analytics data 960 includes, for example, usage of a tool, usage of a feature, usage of a workflow, usage of assets 940, and the like. Application analytics data 960 can include the usage data on a per user basis and can also include the usage data on a per tool basis or per feature basis or per workflow basis or any other basis. Application analytics engine 958 embeds a piece of code in applications 904 that enables the application to collect the usage data and send it to application analytics engine 958. Application analytics engine 958 stores the usage data as application analytics data 960 and processes application analytics data 960 to draw meaningful output. For example, application analytics engine 958 can draw an output that the user uses "Tool 4" a maximum number of times. The output of application analytics engine 958 is used by personalization engine 962 to personalize a tool menu for the user to show "Tool 4" on top. Other types of personalization can also be performed based on application analytics data 960. In addition, personalization engine 962 can also use workspace data 956 or user data 918 including user preferences to personalize one or more application programs 928 for the user.

In some embodiments, application analytics data 960 includes data indicating status of a project of the user. For example, if the user was preparing an article in a digital publishing application and what was left was publishing the prepared article at the time the user quit the digital publishing application, then application analytics engine 958 tracks the state. Now when the user next opens the digital publishing application on another device, then the user is indicated and the state and options are provided to the user for publishing using the digital publishing application or any other application. In addition, while preparing the article, a recommendation can also be made by synchronization engine 932 to incorporate some of other assets saved by the user and relevant for the article. Such a recommendation can be generated using one or more engines, as described herein.

Creative apparatus 908 also includes community engine 964 which enables creation of various communities and collaboration among the communities. A community, as described herein, includes a group of users that share at least one common interest. The community can be closed, i.e., limited to a number of users or can be open, i.e., anyone can participate. The community enables the users to share each other's work and comment or like each other's work. The work includes application program data 930. Community engine 964 stores any data corresponding to the community, such as work shared on the community and comments or likes received for the work as community data 966. Community data 966 also includes notification data and is used for notifying other users by the community engine in case of any activity related to the work or new work being shared. Community engine 964 works in conjunction with synchronization engine 932 to provide collaborative workflows to the user. For example, the user can create an image and can request for some expert opinion or expert editing. An expert user can then either edit the image as per the user liking or can provide expert opinion. The editing and providing of the expert opinion by the expert is enabled using community engine 964 and synchronization engine 932. In collaborative workflows, a plurality of users is assigned different tasks related to the work.

Creative apparatus 908 also includes marketplace engine 968 for providing marketplace to one or more users. Marketplace engine 968 enables the user to offer an asset for selling or using. Marketplace engine 968 has access to assets 940 that the user wants to offer on the marketplace. Creative apparatus 908 also includes search engine 970 to enable searching of assets 940 in the marketplace. Search engine 970 is also a part of one or more application programs 928 to enable the user to perform search for assets 940 or any other type of application program data 930. Search engine 970 can perform a search for an asset using metadata 942 or the file.

Creative apparatus 908 also includes document engine 972 for providing various document related workflows, including electronic or digital signature workflows, to the user. Document engine 972 can store documents as assets 940 in data storage unit 912 or can maintain a separate document repository (not shown in FIG. 9).

In accordance with embodiments of the present invention, application programs 928 include a smart contract platform that facilitates the creation, execution and verification of customized smart contracts. In these embodiments, the smart contract platform is provided to user device 902A such that the smart contract platform 904A operates via the user device. In another embodiment, a smart contract platform is provided as an add-on or plug-in to an application, as further described with reference to FIG. 1 above. These configurations are merely exemplary, and other variations for providing smart contract software functionality are contemplated within the present disclosure.

It is to be appreciated that the engines and working of the engines are described as examples herein, and the engines can be used for performing any step in providing digital experience to the user.

Exemplary Operating Environment

Figure 10:
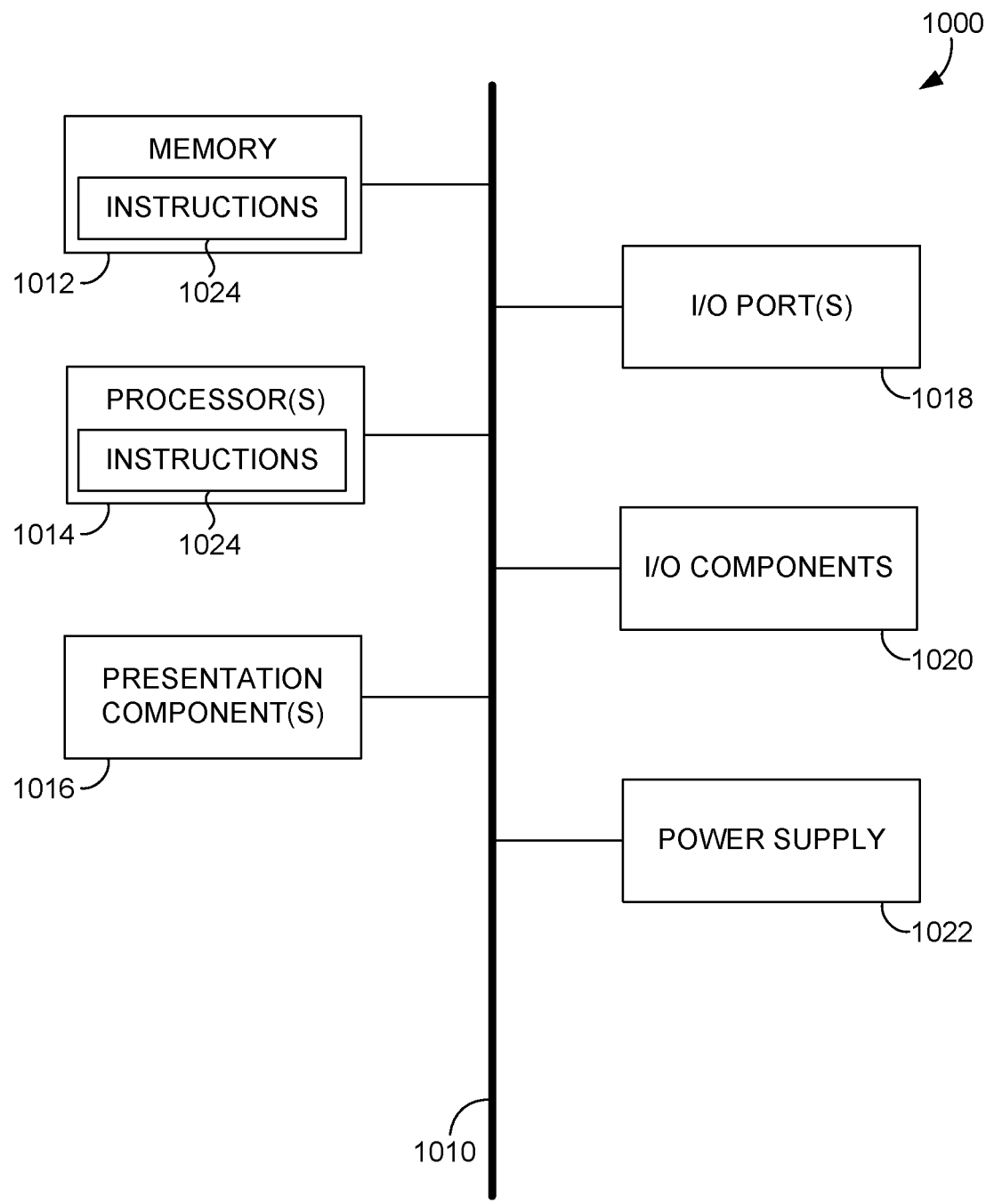
FIG. 10 is a block diagram of an exemplary computing environment suitable for use in implementing embodiments of the present invention.

Having described embodiments of the present invention, an exemplary operating environment in which embodiments of the present invention may be implemented is described below in order to provide a general context for various aspects of the present invention. Referring initially to FIG. 10 in particular, an exemplary operating environment for implementing embodiments of the present invention is shown and designated generally as computing device 1000. Computing device 1000 is but one example of a suitable computing environment and is not intended to suggest any limitation as to the scope of use or functionality of the invention. Neither should the computing device 1000 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 10, computing device 1000 includes a bus 1010 that directly or indirectly couples the following devices: memory 1012, one or more processors 1014, one or more presentation components 1016, input/output (I/O) ports 1018, input/output components 1020, and an illustrative power supply 1022. Bus 1010 represents what may be one or more busses (such as an address bus, data bus, or combination thereof). Although the various blocks of FIG. 10 are shown with lines for the sake of clarity, in reality, delineating various components is not so clear, and metaphorically, the lines would more accurately be grey and ful0y. For example, one may consider a presentation component such as a display device to be an I/O component. Also, processors have memory. The inventor recognizes that such is the nature of the art, and reiterates that the diagram of FIG. 10 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 10 and reference to "computing device."

Computing device 1000 typically includes a variety of computer-readable media. Computer-readable media can be any available media that can be accessed by computing device 1000 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1000. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1012 includes computer-storage media in the form of volatile and/or nonvolatile memory. The memory may be removable, non-removable, or a combination thereof. Exemplary hardware devices include solid-state memory, hard drives, optical-disc drives, etc. Computing device 1000 includes one or more processors that read data from various entities such as memory 1012 or I/O components 1020. Presentation component(s) 1016 present data indications to a user or other device. Exemplary presentation components include a display device, speaker, printing component, vibrating component, etc.

I/O ports 1018 allow computing device 1000 to be logically coupled to other devices including I/O components 1020, some of which may be built in. Illustrative components include a microphone, joystick, game pad, satellite dish, scanner, printer, wireless device, etc. The I/O components 1020 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1000. The computing device 1000 may be equipped with depth cameras, such as stereoscopic camera systems, infrared camera systems, RGB camera systems, touchscreen technology, and combinations of these, for gesture detection and recognition. Additionally, the computing device 1000 may be equipped with accelerometers or gyroscopes that enable detection of motion. The output of the accelerometers or gyroscopes may be provided to the display of the computing device 1000 to render immersive augmented reality or virtual reality.

As can be understood, embodiments of the present invention provide for, among other things, the creation, execution and verification of customized smart contracts. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. One or more computer storage media storing computer-usable instructions that, when used by one or more computing devices, cause the one or more computing devices to perform operations comprising:

providing, by a first node of a distributed ledger network, a graphical user interface configured to accept a selection and arrangement of transaction elements for a smart contract;

automatically generating, by the first node, the smart contract with machine-executable code that implements the selection and arrangement of transaction elements using syntax of a smart contract execution environment associated with the distributed ledger network, wherein automatically generating the smart contract comprises issuing an authorization token that authorizes: (i) access to transactional data, belonging to a user associated with the first node, at a local system associated with a second node of the distributed ledger network, and (ii) entry of a verification of the transactional data into a distributed ledger of the distributed ledger network; and executing the smart contract in the smart contract execution environment on the first node.

2. The one or more computer storage media of claim 1, wherein executing the smart contract in the smart contract execution environment comprises automatically making calls to the smart contract execution environment based on the selection and arrangement of transaction elements.

3. The one or more computer storage media of claim 1, wherein the generated smart contract includes logic that authorizes disclosure, at the second node, of financial data of a participant to the smart contract into the distributed ledger of the distributed ledger network.

4. The one or more computer storage media of claim 1, wherein the smart contract is configured to shield the transactional data of the smart contract in the distributed ledger of the distributed ledger network.

5. The one or more computer storage media of claim 1, the operations further comprising causing presentation of a smart contract form that expresses contractual provisions corresponding to the smart contract in natural language.

6. The one or more computer storage media of claim 5, wherein the smart contract form comprises one or more fields that are linked to the transactional data of the smart contract.

7. A computer-implemented method comprising:

providing, by a customization engine of a first node of a distributed ledger network, a graphical user interface configured to accept a selection and arrangement of transaction elements for a smart contract;

automatically generating, by the customization engine of the first node, the smart contract with machine-executable code that implements the selection and arrangement of transaction elements using syntax of a smart contract execution environment associated with the distributed ledger network, wherein automatically generating the smart contract comprises issuing an authorization token that authorizes: (i) access to transactional data, belonging to a user associated with the first node, at a local system associated with a second node of the distributed ledger network, and (ii) entry of a verification of the transactional data into a distributed ledger of the distributed ledger network; and executing the smart contract in the smart contract execution environment on the first node.

8. The computer-implemented method of claim 7, wherein executing the smart contract in the smart contract execution environment comprises automatically making calls to the smart contract execution environment based on the selection and arrangement of transaction elements.

9. The computer-implemented method of claim 7, wherein the generated smart contract includes logic that authorizes disclosure, at the second node, of financial data of a participant to the smart contract into the distributed ledger of the distributed ledger network.

10. The computer-implemented method of claim 7, wherein the smart contract is configured to shield the transactional data of the smart contract in the distributed ledger of the distributed ledger network.

11. The computer-implemented method of claim 7, further comprising causing presentation of a smart contract form that expresses contractual provisions corresponding to the smart contract in natural language.

12. The computer-implemented method of claim 11, wherein the smart contract form comprises one or more fields that are linked to the transactional data of the smart contract.

13. A node of a distributed ledger system, the node comprising:

one or more hardware processors and memory configured to provide computer program instructions to the one or more hardware processors;

a means for generating a smart contract, using the one or more hardware processors, by providing a graphical user interface configured to accept a selection and arrangement of transaction elements for the smart contract, and generating the smart contract with machine-executable code that implements the selection and arrangement of transaction elements using syntax of a smart contract execution environment associated with the distributed ledger system, wherein the means for generating the smart contract is configured to automatically generate the smart contract by issuing an authorization token that authorizes: (i) access to transactional data, belonging to a user associated with the node, at a local system associated with a second node of the distributed ledger system, and (ii) entry of a verification of the transactional data into a distributed ledger of the distributed ledger system; and the smart contract execution environment configured to use the one or more hardware processors to execute the smart contract.

14. The node of claim 13, further comprising an execution interface configured to use the one or more hardware processors to automatically make calls to the smart contract execution environment based on the selection and arrangement of transaction elements.

15. The node of claim 13, wherein the generated smart contract includes logic that authorizes disclosure, at the second node, of financial data of a participant to the smart contract into the distributed ledger of the distributed ledger system.

16. The node of claim 13, wherein the smart contract is configured to shield the transactional data of the smart contract in the distributed ledger of the distributed ledger system.

17. The node of claim 13, further comprising a smart contract form viewer configured to use the one or more hardware processors to cause presentation of a smart contract form that expresses contractual provisions corresponding to the smart contract in natural language.

* * * * *